United States Patent
Gorodisher et al.

(10) Patent No.: US 9,695,273 B2
(45) Date of Patent: Jul. 4, 2017

(54) AMINE/EPOXY CURING OF BENZOXAZINES

(71) Applicant: 3M INNOVATIVE PROPERTIES COMPANY, St. Paul, MN (US)

(72) Inventors: Ilya Gorodisher, Stillwater, MN (US); Dmitriy Salnikov, Woodbury, MN (US); Mary M. Caruso, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/345,258

(22) PCT Filed: Oct. 25, 2012

(86) PCT No.: PCT/US2012/061865
§ 371 (c)(1),
(2) Date: Mar. 17, 2014

(87) PCT Pub. No.: WO2013/063236
PCT Pub. Date: May 2, 2013

(65) Prior Publication Data
US 2015/0045528 A1    Feb. 12, 2015

Related U.S. Application Data

(60) Provisional application No. 61/552,494, filed on Oct. 28, 2011.

(51) Int. Cl.
| | | |
|---|---|---|
| C08G 59/50 | (2006.01) | |
| C08G 73/02 | (2006.01) | |
| C08L 79/02 | (2006.01) | |
| C08L 79/04 | (2006.01) | |
| C08G 59/40 | (2006.01) | |
| C08L 63/00 | (2006.01) | |

(52) U.S. Cl.
CPC ....... *C08G 59/504* (2013.01); *C08G 59/4007* (2013.01); *C08G 59/50* (2013.01); *C08G 73/0233* (2013.01); *C08L 79/02* (2013.01); *C08L 79/04* (2013.01); *C08L 63/00* (2013.01)

(58) Field of Classification Search
CPC .............................. C08L 63/00; C08G 59/504
USPC .......................................................... 528/96
See application file for complete search history.

(56) References Cited

U.S. PATENT DOCUMENTS

| | | |
|---|---|---|
| 3,018,262 A | 1/1962 | Schroeder |
| 3,298,998 A | 1/1967 | McConnell |
| 3,496,250 A | 2/1970 | Czerwinski |
| 4,118,377 A | 10/1978 | D'Alelio |
| 4,501,864 A | 2/1985 | Higginbottom |
| 4,503,211 A | 3/1985 | Robins |
| 4,719,253 A | 1/1988 | Turpin |
| 5,543,516 A | 8/1996 | Ishida |
| 6,207,586 B1 | 3/2001 | Ma |
| 6,207,786 B1 | 3/2001 | Ishida |
| 6,376,080 B1 | 4/2002 | Gallo |
| 6,437,026 B1 | 8/2002 | Garrett |
| 7,041,772 B2 | 5/2006 | Aizawa |
| 7,053,138 B2 | 5/2006 | Magendie |
| 7,517,925 B2 | 4/2009 | Dershem |
| 8,383,706 B2 | 2/2013 | Gorodisher |
| 2002/0177532 A1* | 11/2002 | Vinci ................... C10M 141/10 508/421 |
| 2004/0116616 A1* | 6/2004 | Lewandowski ........... C08F 4/00 525/340 |
| 2004/0220373 A1* | 11/2004 | Wu ..................... A63B 37/0003 528/196 |
| 2004/0261660 A1* | 12/2004 | Li ........................ C08G 61/122 106/287.22 |
| 2005/0107497 A1* | 5/2005 | Akaho ................... C08K 3/346 523/457 |
| 2005/0216075 A1* | 9/2005 | Wang ..................... A61L 29/18 623/1.15 |
| 2005/0288457 A1* | 12/2005 | Liu .................... C08G 59/4042 525/529 |
| 2006/0102871 A1* | 5/2006 | Wang ............... A61K 47/48992 252/62.51 R |
| 2006/0134901 A1* | 6/2006 | Chaware ............... H01L 21/563 438/612 |
| 2007/0191555 A1* | 8/2007 | Ishida .................. C08G 59/027 525/523 |
| 2008/0076886 A1* | 3/2008 | Burns ................ C08G 18/3206 525/540 |

(Continued)

FOREIGN PATENT DOCUMENTS

| | | |
|---|---|---|
| WO | WO 99/60068 | 11/1999 |
| WO | WO 2005-000955 | 1/2005 |
| WO | WO 2010-092723 | 8/2010 |
| WO | WO 2013-048851 | 4/2013 |

OTHER PUBLICATIONS

Gamlin, "Mechanism and kinetics of the isothermal thermodegradation of ethylene-propylene-diene (EPDM) elastomers", Polymer Degradation and Stability, 2003, vol. 80, No. 3, pp. 525-531.

Ghosh, "Polybenzoxazines—New high performance thermosetting resins: Synthesis and properties", Progress in Polymer Science, 2007, vol. 32, pp. 1344-1391.

Kimura, "New Thermosetting Resin From Bisphenol A-Based Benzoxazine and Bisoxazoline", Journal of Applied Polymer Science, 1999, vol. 72, No. 12, pp. 1551-1558.

Kimura, "New Type of Phenolic Resin: Curing Reaction of Phenol-Novolac Based Benzoxazine with Bisoxazoline or Epoxy Resin Using Latent Curing Agent and the Properties of the Cured Resin", Journal of Applied Polymer Science, 2009, vol. 112, No. 3, pp. 1762-1770.

(Continued)

*Primary Examiner* — Megan McCulley
(74) *Attorney, Agent, or Firm* — Kent S. Kokko

(57) ABSTRACT

Novel oligomers and polymers derived from the reaction of benzoxazine compounds with a mixture of epoxy compounds and amine compounds are disclosed. The compositions are useful in coating, sealants, adhesive and many other applications.

17 Claims, 6 Drawing Sheets

(56) References Cited

U.S. PATENT DOCUMENTS

| | | | |
|---|---|---|---|
| 2008/0233386 A1* | 9/2008 | Shibayama | C08G 59/625 428/332 |
| 2009/0240003 A1* | 9/2009 | Burns | C08G 18/10 525/410 |
| 2010/0007018 A1* | 1/2010 | Wyatt | H01L 24/73 257/737 |
| 2010/0248570 A1* | 9/2010 | Chen | C08J 5/24 442/175 |
| 2013/0140738 A1 | 6/2013 | Gorodisher | |
| 2014/0010983 A1 | 1/2014 | Gorodisher | |
| 2014/0011052 A1 | 1/2014 | Gorodisher | |

OTHER PUBLICATIONS

Rao, "Thermal and Viscoelastic Properties of Sequentially Polymerized Networks Composed of Benzoxazine, Epoxy, and Phenalkamine Curing Agents", Journal of Applied Polymer Science, 2006, vol. 100, No. 5, pp. 3956-3965.

Rimdusit, "Development of new class of electronic packaging materials based on ternary systems of benzoxazine, epoxy, and phenolic resins", Polymer, 2000, vol. 41, No. 22, pp. 7941-7949.

Pocius, "The Electrochemistry of the FPL (Forest Products Laboratory) Process and its Relationship to the Durability of Structural Adhesive Bonds", The Journal of Adhesion, 1992, vol. 39, No. 2-3, p. 101-121.

International Search Report for PCT International Application No. PCT/US2012/061865 mailed on Jan. 22, 2013, 3 pages.

* cited by examiner

AMINE/EPOXY CURING OF BENZOXAZINES

CROSS REFERENCE TO RELATED APPLICATIONS

This application is a national stage filing under 35 U.S.C. 371 of PCT/US2012/061865, filed Oct. 25, 2012, which claims priority to Provisional Application No. 61/552,494, filed Oct. 28, 2011, the disclosure of which is incorporated by reference in its/their entirety herein.

FIELD OF THE INVENTION

The present disclosure is directed to novel oligomers and polymers derived from the reaction of benzoxazine compounds with a mixture of amine compounds and epoxy compounds. The compositions are useful in coating, sealants, adhesive and many other applications.

BACKGROUND

Benzoxazines and compositions containing benzoxazines are known (see for example, U.S. Pat. No. 5,543,516 and U.S. Pat. No. 6,207,786 to Ishida, et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura, et al., "New Thermosetting Resin from Bisphenol A-based Benzoxazine and Bisoxazoline", J. App. Polym. Sci., 72, 1551-58 (1999).

U.S. Pat. No. 4,501,864 (Higginbottom) reports a curable composition comprising a poly(3,4-dihydro-3-substituted-1,3 benzoxazine) and a reactive polyamine, wherein the polyamine is at least difunctional and its reactive groups are primary or secondary amine, and wherein the poly(dihydrobenzoxazine) is the reaction product of about one equivalent of a primary amine, about one equivalent of a phenol and about two equivalents of formaldehyde.

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

U.S. Pat. No. 6,207,586 (Ishida et al.) states that the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. FTIR (Fourier transform infrared) analysis is often used to monitor the conversion of the oxazine rings to polymers to provide an estimate of the rate of polymerization at different temperatures. NMR (nuclear magnetic resonance) spectroscopy can also be used to monitor conversion of benzoxazine monomers to polymer.

Epoxy adhesives have been widely used in structural adhesive applications and satisfy many demanding industrial applications. However epoxies have many noted deficiencies that limit their use including limited high temperature stability, high moisture uptake, shrinkage, and a large exotherm on polymerization.

Polybenzoxazines have been proposed to overcome many of the limitations on epoxies. They have lower exotherms on curing, less shrinkage, have higher thermal stability, low byproducts and may be readily prepared from benzoxazines, which in turn, are readily prepared from an amine, formaldehyde and a phenol in high yields. However, current methods of preparing polybenzoxazines require relatively high temperatures, and typically produce brittle, highly crosslinked polymers.

Efforts to reduce the polymerization temperature have included the addition of various phenols or Lewis acid accelerators, or copolymerization of the benzoxazine with epoxides or other monomers such as phenol-formaldehyde. However the resultant polybenzoxazine-epoxy hybrids retain many of the limitations of the epoxies, and compromise many desirable features thereof, such as epoxy toughness.

SUMMARY

The present disclosure is directed to novel benzoxazine/epoxy/amine adducts. Further, the present disclosure is directed to a method of preparing the adducts, which comprises reacting a mixture of benzoxazine compound and an epoxy compound with a primary or secondary amine compound, the reaction resulting in ring-opening of the oxazine ring resulting in a mixture of aminomethyl aminophenolic compounds, which may further react with the epoxy compounds. Independently, the amine compound ring opens the epoxy ring. The present benzoxazine/epoxy/amine adducts may be cured to produce cured compositions useful in coating, sealants, adhesive and many other applications. The present disclosure further provides a curable composition comprising a benzoxazine compound, a primary or secondary amine compound and an epoxy compound, which when cured is useful in adhesive, coating and bonding applications. Unexpectedly, the amine compounds independently contribute to the ring opening of the benzoxazine and epoxy compounds.

In the process of preparing the benzoxazine/epoxy/amine adducts, each of the starting materials may be mono- or higher functionality. The benzoxazine may be a mono- or higher benzoxazine, the amine compound may be a mono- or higher amine, and the epoxy compound may be a mono- or higher epoxy compound. It is preferred that at least one of the epoxy and amine compounds must be a polyfunctional compound, i.e. a polyepoxy or a polyamine.

As used herein the term "benzoxazine" is inclusive of compounds and polymers having the characteristic benzoxazine ring. In the illustrated benzoxazine group, R is the residue of a mono- or polyamine.

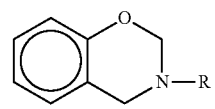

I where R represents a (hetero)hydrocarbyl groups, including (hetero)alkyl and (hetero)aryl groups.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl.and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein "(hetero)hydrocarbyl" is inclusive of (hetero)hydrocarbyl alkyl and aryl groups, and hetero(hetero)hydrocarbyl heteroalkyl and heteroaryl groups, the later comprising one or more catenary oxygen heteroatoms such as ether or amino groups. (Hetero)hydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero)hydrocarbyls as used herein include, but are not limited to methoxy, ethoxy, propoxy, 4-diphenylaminobutyl, 2-(2'-phenoxyethoxyl)ethyl, 3,6-dioxaheptyl, 3,6-dioxahexyl-6-phenyl, in addition to those described for "alkyl", "heteroalkyl", "aryl" and "heteroaryl" supra.

DETAILED DESCRIPTION

Figure 1:
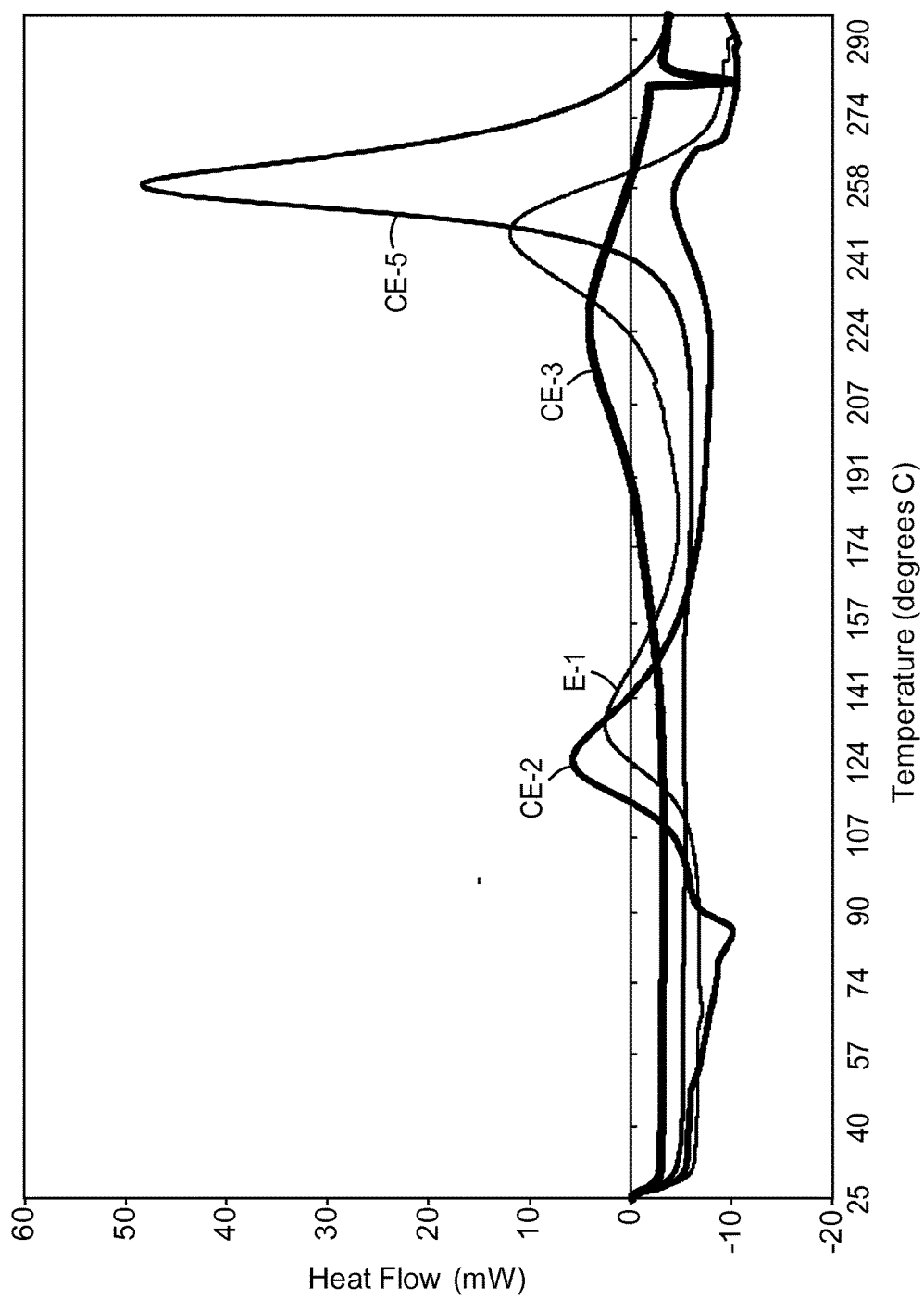
FIG. 1: DSC Cure Traces of Examples E-1, CE-2, CE-3, and CE-5

The present disclosure is directed to novel benzoxazine/epoxy/amine adducts, prepared by the reaction of an amino compound with a mixture of a benzoxazine compound and an epoxy compound. The adducts are characterized as having the characteristic group resulting from ring opening of the oxazine ring with an amine and the ring opening of an epoxy group with an amine compound. The benzoxazine/amine adducts may be described as a mixture of aminomethyl aminophenolic compounds, which may be oligomeric or polymeric. The phenolic group resulting from the ring opening of the oxazine may further react to ring-open the epoxy groups.

In the illustrated benzoxazine ring-opened structure, $R^5$ is the residue of a mono- or polyamine and $R^{10}$ is the residue of a mono- or polyamine, and $R^1$ is the residue of an aldehyde.

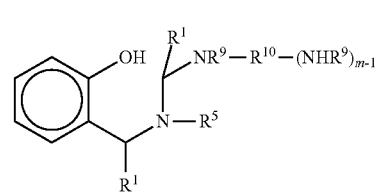

wherein
each $R^1$ is H or an alkyl group, and is the residue of an aliphatic aldehyde,
$R^5$ is the (hetero)hydrocarbyl residue of a primary amino compound, which may be a mono- or polyamine,
$R^9$ is H or a hydrocarbyl group, including aryl and alkyl;
$R^{10}$ is the (hetero)hydrocarbyl group, and
m is 1 to 6.

It will be understood that the moiety —$NR^9$—$R^{10}$—$(NHR^9)_{m-1}$ represents the residue of an amine compound that are used to ring-open and cure the starting benzoxazine compounds and independently the epoxy compounds.

As used herein the term "residue" is used to define that (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of hexamethylene diamine, $H_2N$—$C_6H_{12}$—$NH_2$ is the divalent alkyl —$C_6H_{12}$—. The residue of phenylene diamine $H_2N$—$C_6H_4$—$NH_2$, is the divalent aryl —$C_6H_4$—. The residue of diamino-polyethylene glycol, $H_2N$—$(C_2H_4O)_{1-20}$—$C_2H_4$—$NH_2$, is the divalent (hetero)hydrocarbyl polyethylene glycol —$(C_2H_4O)_{1-20}$—$C_2H_4$—.

In the preparation of the benzoxazine-epoxy adducts, any benzoxazine compound may be used. Benzoxazines may be prepared by combining a phenolic compound, and aliphatic aldehyde, and a primary amine compound. U.S. Pat. No. 5,543,516 (Ishida), hereby incorporated by reference, describes a solventless method of forming benzoxazines. U.S. Pat. No. 7,041,772 (Aizawa et al.) describes a process for producing a benzoxazine resin which comprises the steps of reacting a phenol compound, an aldehyde compound and a primary amine in the presence of an organic solvent to synthesize a benzoxazine resin and removing generated condensation water and the organic solvent from a system under heating and a reduced pressure. Other suitable reaction schemes to produce mono-, di- and higher-functional benzoxazines are described in N. N. Ghosh et al., *Polybenzoxazine-new high performance thermosetting resins: synthesis and properties, Prog. Polym. Sci.* 32 (2007), pp.

1344-1391. One suitable method of producing the starting benzoxazine compounds is illustrated by the following reaction scheme:

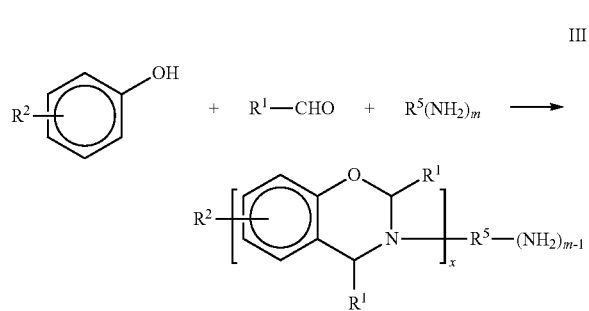

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-6; and
x is at least 1. It will be understood that the free amino groups depicted may further react to produce additional benzoxazine groups.

A monophenol is illustrated for simplicity. Mono- or polyphenolic compounds may be used. The phenolic compound may be further substituted without limitation is desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxyalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

With respect to the $R^2$ group of Formula III, numerous phenolic compounds are contemplated. $R^2$ may be an H, a covalent bond "—" which represents a biphenyl-type phenolic compounds, or $R^2$ may be a divalent aliphatic group linking aryl rings. For example, $R^2$ may be a divalent isopropyl group, derived from bisphenol-A, generally illustrated as follows:

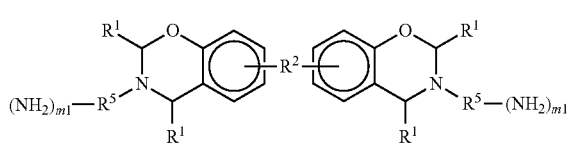

where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;

$R^5$ is the (hetero)hydrocarbyl residue of a primary amino compound, $R^5(NH_2)_m$, where m is 1-6. It will be understood that the free amino groups depicted may further react to produce additional benzoxazine groups.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol, 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted, mono-, disubstituted or higher (hetero)hydrocarbyl amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl. It has been observed that benzoxazines derived from aromatic amines, such as aniline, are less reactive toward the thiol reactants than benzoxazines derived from aliphatic amines as indicated, for example by the corresponding reaction temperatures.

Amines useful in the preparation of the starting benzoxazine compounds include those of the formula:

$$R^5(NH_2)_m \qquad\qquad V$$

and include (hetero)hydrocarbyl monoamines and polyamines. $R^5$ may be (hetero)hydrocarbyl group that has a valence of m, and is the residue of a mono-, di- or higher amine having at least one primary amine group. $R^5$ can be an alkyl, a cycloalkyl or aryl and m 1 to 4. The $R^5$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen. Generally, benzoxazines derived from aromatic amines ($R^5$=aryl) are more reactive.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polymeric polyoxyalkylene, polyester, polyolefin, poly(meth)acrylate, polystyrene or polysiloxane polymer having pendent or terminal reactive —$NH_2$ groups. Useful polymers include, for example, amine-terminated oligo- and poly-(diaryl)siloxanes and (dialkyl)siloxane amino terminated polyethylenes or polypropylenes, and amino terminated poly(alkylene oxides).

Any primary amine may be employed. Useful monoamines include, for example, methyl-, ethyl-, propyl-, hexyl-, octyl, dodecyl-, dimethyl-, methyl ethyl-, and aniline. The term "di-, or polyamine," refers to organic compounds containing at least two primary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine Useful diamines include N-methyl-1,3-propanediamine; N-ethyl-1,2-ethanediamine; 2-(2-aminoethylamino)ethanol; pentaethylenehexaamine; ethylenediamine; N-methylethanolamine; and 1,3-propanediamine.

Examples of useful polyamines include polyamines having at least three amino groups, wherein at least one of the three amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N(CH_2CH_2CH_2CH_2CH_2CH_2NH)_{1-10}H$, $H_2N(CH_2)_3NHCH_2CH=CHCH_2NH(CH_2)_3NH_2$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn.

Many di- and polyamines, such as those just named, are available commercially, for example, those available from Huntsman Chemical, Houston, Tex. The most preferred di- or polyamines include aliphatic di- and triamines or aliphatic di- or polyamines and more specifically compounds with two or three primary amino groups, such as ethylene diamine, hexamethylene diamine, dodecanediamine, and the like.

Other useful amines include amino acids such as glycine, alanine, and leucine and their methyl esters, aminoalcohols such as ethanolamine, 3-aminopropanol, and 4-aminobutanol, polyaminoethers containing ethylene glycol and diethylene glycol (such as Jeffamine™ diamines), and alkenyl amines such as diallylamine and allylmethylamine.

It will be understood that monoamines will cyclize with the aldehyde and phenolic compound to produce mono-benzoxazine compounds, while di- or higher amines will cyclize to produce di- and poly-benzoxazine compounds: For example, a diamine (m=2 in the Scheme VI below) will produce a di-benzoxazine.

VI

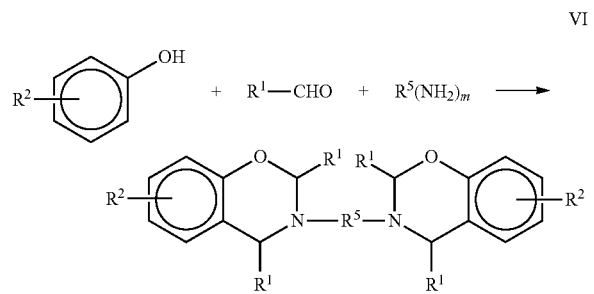

wherein each $R^1$ is H or an alkyl group, and is the residue of an aliphatic aldehyde;

$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
and m is 2.

If a polyamine and a polyphenol are used in the preparation, a polybenzoxazine will result. As used herein the term polybenzoxazine will refer to compounds having two or more benzoxazine rings. The term "poly(benzoxazine)" will refer to polymers resulting from acid-catalyzed ring-opening and homopolymerization of benzoxazine compounds.

VII

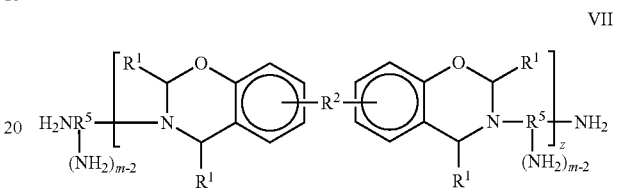

wherein,
each of $R^1$ is H or an alkyl group;
$R^2$ is a covalent bond, or a divalent (hetero)hydrocarbyl group;
m is 2-4;
z is at least 2;
$R^5$ is the divalent (hetero)hydrocarbyl residue of a primary diamino compound.

The adduct is formed, in part, by ring-opening of epoxy compounds in the following Scheme XIII:

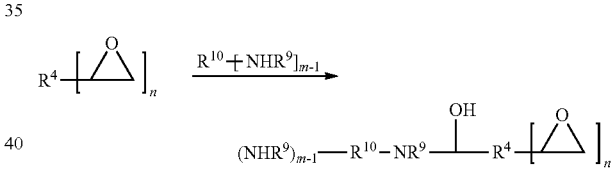

where $R^4$ is an (hetero)hydrocarbyl having a valence of n, and n is 1 to 6
$R^9$ is H or a hydrocarbyl group, including aryl and alkyl;
$R^{10}$ is the (hetero)hydrocarbyl group, and
m is 1 to 6.

Polyepoxy compounds which can be utilized in the composition of the invention include both aliphatic and aromatic polyepoxides, but glycidyl aliphatic epoxides are preferred. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the invention include 3',4'-epoxycyclohexylmethyl-3,4-epoxycyclohexanecarboxylate, 3,4-epoxycyclohexyloxirane, 2-(3',4'-epoxycyclohexyl)-5, IH-spiro-3H4H-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the composition of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxyl)phenyl-propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3l-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 and 3,298,998, as well as the derivatives described in the Handbook of Epoxy Resins by Lee and Neville, McGraw-Hill Book Co., New York (1967), and mixtures thereof.

A preferred class of polyepoxy compounds are polyglycidyl ethers of polyhydric alcohol, particularly polyphenols. The glycidyl epoxy compounds are generally more reactive toward amines than cycloaliphatic epoxy compounds. In some preferred embodiments, the epoxy compound generally has an epoxy equivalent weight (EW) of between 170 to about 4,000, preferably between 170 and 1,000. The epoxide equivalent weight (EW) is defined as the weight in grams of the epoxy functional compound that contains one gram equivalent of epoxy (oxirane) functional groups.

The benzoxazine ring is further ring-opened by an amine compound. Useful amine compounds correspond to primary and secondary amines of the formula:

$$R^{10}(NHR^9)_m, \quad \text{IX}$$

and include primary and secondary (hetero)hydrocarbyl monoamines and polyamines $R^{10}$ may be (hetero)hydrocarbyl group that has a valence of m, and is the residue of a mono-, di- or higher amine having at least one primary amine group. $R^{10}$ can be an alkyl, a cycloalkyl or aryl and m 1 to 4. The $R^{10}$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen. Each $R^9$ is independently H or a hydrocarbyl group, including aryl and alkyl, and m is 1 to 6.

It will be clear to one skilled in the art that the primary and secondary amines corresponding to those used in the preparation of the benzoxazines (Scheme VI, supra) will also be useful in the ring-opening reaction, in combination with the epoxy compounds. Amine compounds useful in the ring-opening of the benzoxazine and epoxy rings include those described supra. Aliphatic amines are observed to be more reactive nucleophiles and ring-open benzoxazines at lower temperatures than the aromatic amines.

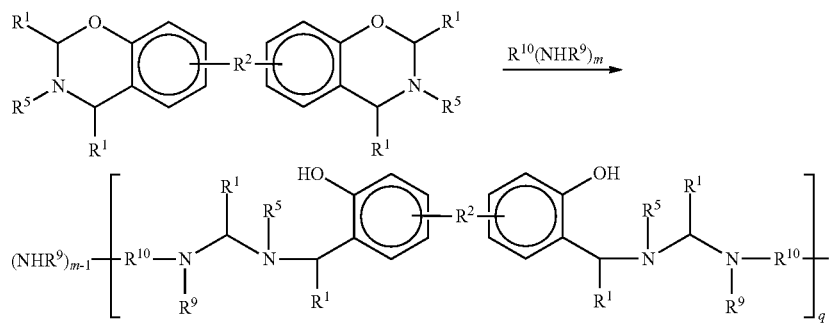

Or

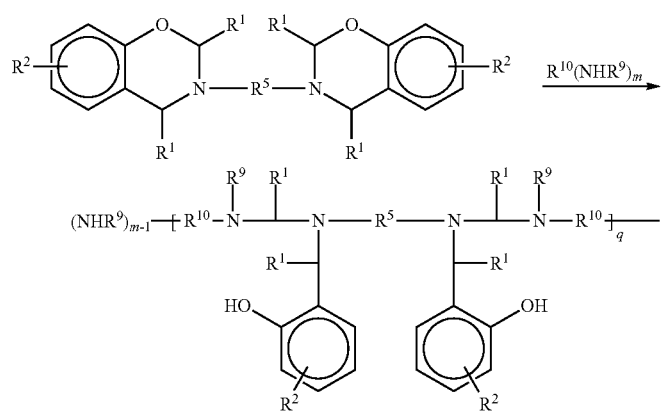

where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
$R^8$ is the (hetero)hydrocarbyl group,
Z is a mixture of —S— or —$NR^9$, where each $R^9$ is H or a hydrocarbyl group, including aryl and alkyl,
p is 1 to 6;
q is at least 1, preferably at least 2.

The DSC exotherm data of the ring opening suggests that aliphatic amines are more reactive than aromatic amines. Benzoxazines derived from aromatic amines ring open with a sharp exotherm in the 100-130° C. range with a primary aliphatic amine nucleophile. The addition of a Brönsted acid will shift the exotherm peak to lower temps, with the magnitude of the shift related to the acid strength. Thus, it is possible to push the cure peak close to 80° C. with the addition of a superacid, such as pentahaloantimonates.

In addition to the ring opening of the benzoxazine and epoxy rings, it is believed that the phenolic intermediate from the ring opening of the benzoxazine, may further react to ring open additional epoxy groups:

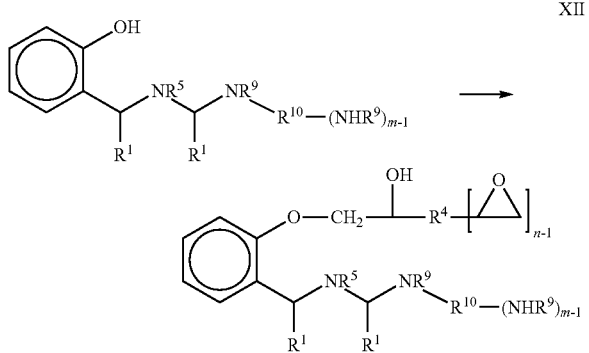

Note that Schemes X and XI, and other schemes herein, the product depicts a mixture of free epoxy (or hydroxyl) and amine groups. The depiction is used to account for all the epoxy and amine groups present in the starting materials, which are available for subsequent reaction. Thus the starting bis-benzoxazine reacts with the amine compound (XII) of the and the initial reaction product has "m−1" amino groups, which may be available for further reaction with additional benzoxazine groups and/or epoxy groups. Independently, the amine compound (XII) reacts with the epoxy compound (VII) and the initial reaction products has "n−1" epoxy groups and "m−1" amine groups available for further reaction. Further, the starting benzoxazine was prepared for a polyamine; therefore $R^5$ groups may be connected to additional benzoxazine groups.

Note further that as the composition preferably comprises at least one polyfunctional epoxy compound or amine compound, polymeric reaction products result.

The mixture of amine, benzoxazine and epoxy compounds is used in amounts such that the molar ratio of amine groups to the sum of the epoxy groups and the benzoxazine groups is from 2:1 to 1:10, preferably 1:1 to 1:2. The ratio of epoxy equivalents to benzoxazine equivalents in the mixture is from 50:1 to 1:5. It will be understood that a primary amine has two molar equivalents and a secondary amine has one molar equivalent.

In some embodiments it is preferable to have an excess of benzoxazine, as an unreacted benzoxazine will homopolymerize to form a coextensive mixture or polymer network of benzoxazine/epoxy/amine adduct and poly(benzoxazines), as illustrated below. In such embodiments, the molar amounts ratio of benzoxazine groups to the sum of amine and epoxy groups is about 1.1:1 to 50:1. Generally, benzoxazines derived from aromatic amines (R=aryl) are more ready homopolymerized than aliphatic amines.

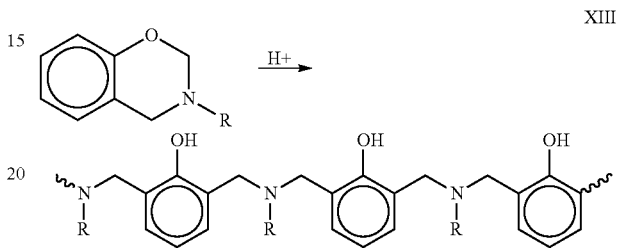

In some embodiments it is desirable to have an excess of epoxy compounds, as excess unreacted epoxy will also homopolymerize to form a coextensive mixture or polymer network of benzoxazine/epoxy/amine adduct and poly(epoxides). In such embodiments, the molar amounts ratio of epoxy groups to the sum of amine and benzoxazine groups is about 1.1:1 to 50:1.

The compounds of Schemes X and XI may be prepared by combining the benzoxazine compounds, the amine compounds and the epoxy compounds neat or in a suitable solvent. Suitable solvents include those in which the reactants dissolve, preferably at room temperature. Solvents may include that is non-reactive with the reactants and that provides for the subsequent dissolution of co-reactants. Examples of suitable solvents include butyl acetate, toluene, xylene, tetrahydrofuran, ethylene glycol dimethyl ether and the like. Heating is generally unnecessary as the thiol and amine-induced ring opening is exothermic.

If desired an acid catalyst may be used to promote the ring-opening of the benzoxazine. Lewis and Brönsted acids accelerate the amine cure of benzoxazine and epoxy adducts as indicated by the lower onset of polymerization temperature and reduced temperature of the peak of the exotherm corresponding to the cure. Suitable acid catalysts include, but are not limited to: strong inorganic acids such as hydrochloric acid, sulfuric acid, phosphoric acid, and the like; and organic acids such as acetic acid, para-toluene sulfonic acid, and oxalic acid. Acid catalysts may be used in amounts of 2 wt. % or less, preferably 1 wt. % or less, most preferably 0.5 wt. % or less, relative to the amounts of benzoxazine and epoxy reactants. Superacids, such as pentafluoroantimonic acids may be used to effect the homopolymerization of the benzoxazines.

The compositions may be used as coatings, including hard surface coatings, and pattern coatings; as adhesives, including pressure sensitive adhesives and structural adhesives; as sealants; and as coatings for electronics and other substrates. When uncured or partially cured, the benzoxazine compositions exhibit pressure-sensitive adhesive properties, including tack. In some embodiments, the present disclosure provides a coated article comprising a substrate, having a cured coating of the benzoxazine-amine/epoxy adduct thereon.

The composition may be coated onto substrates at useful thicknesses ranging from 25-500 micrometers or more. Coating can be accomplished by any conventional means such as roller, dip, knife, or extrusion coating. Solutions of the curable composition may be used to facilitate coating. Stable thicknesses are necessary to maintain the desired coating thickness prior to crosslinking of the composition to form the crosslinked composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

The instant disclosure further provides an adhesive article which comprises a coating of the uncured or partially cured benzoxazine composition on a suitable substrate, such as an adhesive tape backing. A preferred method of preparing a pressure sensitive adhesive article comprises partially curing the novel composition to a useful coating viscosity, coating the partially crosslinked composition onto a substrate (such as a tape backing) and further curing the composition. Useful coating viscosities are generally in the range of 500 to 10,000 cps.

EXAMPLES

Procedures and Test Methods

Except where specified to the contrary, amounts are given in equivalents (eq). Equivalents are based on the moles of reactive groups per mole of reactant molecule. Hence, 2 equivalents of a bifunctional reactant represent one mole of that reactant, and one mole of a trifunctional reactant would represent 3 eq of that reactant. Catalysts are treated as if monofunctional.

Differential Scanning calorimetry (DSC) was performed on an aliquot of a given reaction mixture which was placed into an open aluminum DSC pan and heated at 10° C./min from 25° C. to 300° C. in a Differential Scanning calorimeter (Seiko Instruments USA, Inc., Torrance, Calif.). Cohesive Strength was measured using the Overlap Shear Strength Test (OLS). Overlap, or "lap", shear specimens were made using 4 in×7 in×0.063 in (10 cm×18 cm×0.16 cm) 7075 T6 bare aluminum that had been anodized according to Boeing Aircraft Company Specification BAC-5555. The anodization voltage was 22.5 volts. The specimen was generated as described in ASTM Test Method D-1002. The specific thermal coating conditions varied, as described below in each Example.

Generally, a strip of approximately 0.5 in (1.3 cm)×0.15 mm of adhesive was applied to one edge of each of the two adherends using a scraper. Three 75-micron diameter piano wires were used as spacers for bondline thickness control. The bond was closed and taped on the edge. The bond was placed between sheets of aluminum foil and pieces of cardboard. Two 14 lb (6.4 kg) steel plates were used to apply pressure to provide for adhesive spreading. After the adhesive had been allowed to cure (as described in each Example), the large specimen was cut into 1 in (2.5 cm) wide smaller specimens, providing a 0.5 in$^2$ (3.2 cm$^2$) bonded area. Six lap shear specimens were obtained from each larger specimen. The bonds were tested to failure at room temperature on a SINTECH Tensile Testing machine (MTS, Eden Prairie, Minn.), using a crosshead displacement rate of 0.1 in/min. The failure load was recorded. The lap width was measured with a Vernier caliper. The quoted lap shear strengths are calculated as (2 times the failure load)/(measured width). The average (mean) and standard deviation were calculated from the results of six tests. Adhesive peel was determined using the Floating Roller Peel test.

The Floating Roller Peel (FRP) Strength Test for Adhesive Film was measured using primed panels of 2024-T3 bare aluminum measuring 8 inches long by 3 inches wide by 0.063 inches thick (20.3×7.6×0.16 centimeters), and 10 inches long by 3 inches wide by 0.025 inches thick (25.4× 7.6×0.064 centimeters), were prepared for testing as described below in "Forest Products Laboratory (FPL) Etched and Phosphoric Acid Anodized Aluminum Substrate." The primed panels were bonded together using the same film adhesive and cure cycle employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch (2.54 cm.)

Forest Products Laboratory (FPL) Etched and Phosphoric Acid Anodized Aluminum Substrate (Modified)

The aluminum substrates as described above were treated as follows before bonding:
1) soaking for 10 minutes in a caustic wash solution such as ISOPREP 44, available from Martin Aerospace, Los Angeles, Calif., USA, at a temperature of 160±10° F. (71° C.);
2) submerging the sheets (in a rack) in tank of tap water for 10 minutes;
3) spray rinsing with tap water for 2-3 minutes;
4) soaking at 150° F. (66° C.) for 10 minutes in a tank of FPL etch (a hot solution of sulfuric acid, sodium dichromate, and aluminum, according to section 7 of the latest revision of ASTM D-2651, similar to the process described by Forest Products Laboratory of Madison, Wis., USA; see *The Electrochemistry of the FPL (Forest Products Laboratory) Process and its Relationship to the Durability of Structural Adhesive Bonds*, A. V. Pocius, The Journal of Adhesion, Volume 39, Issue 2-3, 1992);
5) spray rinsing with tap water for 3-5 minutes;
6) drip drying for 10 minutes at ambient temperature and then for 30 minutes in a re-circulating air oven at 150° F. (71° C.).

In all cases, the panels were further treated as follows. The etched panels were anodized by immersion in phosphoric acid at 22° C. with an applied voltage of 15 Volts for 20-25 minutes, followed by rinsing with tap water. With the wet sample surfaces approximately horizontal, the water film was observed to check for any "water breaks" where the surface developed unwetted regions, which would indicate surface contamination. This step was followed by air drying for 10 minutes at room temperature, then oven drying in a forced air oven at 66° C. for 10 minutes. The resulting anodized aluminum panels were immediately primed within 24 hours of treatment. The anodized panels were primed with a corrosion inhibiting primer for aluminum (3M Scotch-Weld™ Structural Adhesive Primer EW-5000, available from 3M Company, St. Paul, Minn., USA) according to the manufacturer's instructions to give a dried primer thickness of between 0.00010 and 0.00020 inches (2.6 to 5.2 micrometers).

DMA Sample Preparation.

Compositions from the Examples 18-20 were cast into a silicone mold, sandwiched between two silicone release liner coated PET sheets. Said mold consisted of an approximately 1.5 mm thick sheet with rectangular cutouts (approximately 5 mm wide×30 mm long) to prepare samples for the dynamic mechanical analysis. The assembly was then clamped between two glass sheets and allowed to cure at 100° C. for 60 minutes, followed by an additional 60 minutes at 180° C. The clamped assembly was then allowed to cool to room temperature, and the samples were then removed and run in a Seiko DMS-200 dynamic mechanical analyzer in tensile mode heated at 2° C./minute in the temperature range between 25° C. and 300° C. The cured samples were translucent, lemon-yellow in color.

TABLE 1

Materials Used

| | |
|---|---|
| AMINE-1 (D230) | Jeffamine ® D230, a polyetheramine from Huntsman Chemical, The Woodlands, TX, USA. |
| AMINE-2 (IPDA) | Isopheronediamine, from BASF Corporation, Florham Park, NJ, USA. |
| BENZOXAZINE (BisABZ) | Araldite ® MT 35600, N-Phenyl Bis A Benzoxazine, based on Bisphenol-A, from Huntsman Chemical, The Woodlands, TX, USA. |
| EPOXY-1 (4221) | ERL 4221, a cycloaliphatic epoxy resin from Dow Chemical, Midland, MI, USA. |
| EPOXY-2 (828) | EPON ™ 828, a diglycidyl ether of bisphenol-A (DGEBA) liquid epoxy resin from Hexion Specialty Chemicals (now Momentive Specialty Chemicals Inc.,) Columbus, OH, USA. |
| EPOXY-3 (MX-125) | KANE ACE ® MX-125 core-shell particle toughened EPOXY-2 from Kaneka Texas Corporation, Pasadena, TX, USA. |
| EPOXY-4 | DER6510-HT glycidyl epoxide resin from Dow Chemical, Midland, MI, USA. |
| Nacure ® 7231 | NACURE ® Super XC-7231 CATALYST, an ammonium antimony hexafluoride "superacid" catalyst for thermally initiated cationic polymerization, including fast cure of epoxy resins. It is available from King Industries Inc., Norwalk, CT, USA. |
| Paraloid ™ 2600 | PARALOID ™ EXL-2600, a core/shell impact modifier in a powder form based on butadiene rubber, from The Dow Chemical Co., Midland, MI, USA. |
| p-TsOH | p-toluene sulfonic acid, commercially available from Sigma-Aldrich Corp., St. Louis, MO, USA. |
| D230CS | A 1:1 ratio mixture of Paraloid ™ 2600 core-shell (CS) powder pre-dispersed in Jeffamine ® D230. | mol = moles (equivalent) of functional group

The Examples (E) and Comparative Examples (CE) are summarized in the following table, and are described in more detail in the following sections.

TABLE 2

Summary of Examples (E) and Comparative Examples (CE)

| Sample | BisABZ mol | Epoxy mol | Amine mol | Acid | 1st Exotherm Onset ° C. | 1st Exoth. Peak ° C. | 2nd Exoth. Onset ° C. | 2nd Exoth. Peak ° C. | Cure Energy Released J/g |
|---|---|---|---|---|---|---|---|---|---|
| CE-1 | 4.4 mg | | | | 188 | 240 | — | — | 326 |
| CE-2 | 0.01 | | D230 0.01 | | 86 | 125 | 221 | 256 | 250 |
| CE-3 | | 4221 0.01 | D230 0.01 | | 113 | 226 | — | — | 284 |
| CE-4 | | 828 0.01 | D230 0.01 | | 48 | 120 | — | — | 175 |
| CE-5 | 0.01 | 4221 0.01 | | | 214 | 260 | — | — | 381 |
| CE-6 | 0.01 | 828 0.01 | | | 203 | 278 | — | — | 257 |
| E-1 | 0.01 | 4221 0.01 | D230 0.01 | | 90 | 133 | 182 | 248 | 272 |
| E-2 | 0.01 | 828 0.01 | D230 0.01 | | 50 | 125 | 183 | 237 | 146 |
| E-3 | 0.02 | 4221 0.01 | D230 0.02 | | 86 | 129 | 172 | 241 | 254 |
| E-4 | 0.01 | 4221 0.02 | D230 0.01 | | 102 | 137 | 184 | 253 | 252 |
| E-5 | 0.02 | 828 0.01 | D230 0.03 | | | | | | |
| E-6 | 0.01 | 828 0.02 | D230 0.03 | | | | | | |

TABLE 2-continued

Summary of Examples (E) and Comparative Examples (CE)

| Sample | BisABZ mol | Epoxy mol | Amine mol | Acid | 1st Exotherm Onset ° C. | 1st Exoth. Peak ° C. | 2nd Exoth. Onset ° C. | 2nd Exoth. Peak ° C. | Cure Energy Released J/g |
|---|---|---|---|---|---|---|---|---|---|
| E-7 | 0.01 | 4221 0.01 | D230 0.02 | | 94 | 133 | 190 | 254 | 146 |
| E-8 | 0.01 | 4221 0.01 | D230 0.005 | | 101 | 133 | 173 | 246 | 298 |
| E-9 | 0.01 | 828 0.01 | D230 0.02 | | 50 | 124 | 221 | 255 | 225 |
| E-10 | 0.01 | 828 0.01 | D230 0.005 | | 48 | 121 | 187 | 234 | 192 |
| E-11 | 0.01 | 4221 0.01 | D230 0.01 | Nacure | 74 | 123 | — | — | 248 |
| E-12 | 0.01 | 4221 0.01 | D230 0.01 | p-TsOH | 67 | 120 | — | — | 344 |
| E-13 | 0.01 | 828 0.01 | D230 0.01 | Nacure | 76 | 104 | — | — | 310 |
| E-14 | 0.01 | 828 0.01 | D230 0.01 | p-TsOH | 64 | 114 | — | — | 120 |
| E-15 | 0.1 | 4221 0.1 | D230 CS 0.1 | | | | | | |
| E-16 | 0.1 | 828 0.1 | D230 CS 0.2 | | | | | | |
| E-17 | 0.1 | MX-125 0.1 | D230 CS 0.2 | | | | | | |
| E-18 | 0.1 | 4221 0.1 | D230 0.1 | | | | | | |
| E-19 | 0.1 | 828 0.1 | D230 0.2 | | | | | | |
| E-20 | 0.1 | MX-125 0.1 | D230 0.2 | | | | | | |
| E-21 | 0.1 | MX-125 0.1 | IPDA 0.05 | | | | | | |
| E-22 | 0.1 | EPOXY-4 0.1 | IPDA 0.05 | | | | | | |
| E-23 | 0.1 | MX-125 0.1 | D230 CS 0.2 | | | | | | |
| E-24 | 0.3 | 4221 0.3 | D230 0.3 | | | | | | |

1. EXPERIMENTAL:
1.1 PREPARATION

Comparative Example 1

BENZOXAZINE (BisABZ) 4.4 mg of BENZOXAZINE were heated in a differential scanning calorimeter (DSC) pan at 10° C./min using a TA Instruments (Newcastle, Del., USA) Differential Scanning calorimeter. The onset of the benzoxazine homopolymerization exotherm is at 188° C. with its peak at 240° C. The total cure energy released was measured to be 326 J/g.

Comparative Example 2: BENZOXAZINE+D230

To 2.31 g (0.01 mol) of finely ground BENZOXAZINE powder were added 1.15 g (0.01 mol) of Jeffamine® D230. The mixture was stirred at room temperature and an aliquot was taken for DSC.

Comparative Example 3: EPOXY-1+D230

To 1.25 g (0.01 mol) of EPOXY-1 were added 1.15 g (0.01 mol) of Jeffamine® D230. The mixture was stirred at room temperature and an aliquot was taken for DSC.

Comparative Example 4: EPOXY-2+D230

To 1.78 g (0.01 mol) of EPOXY-2 were added 1.15 g (0.01 mol) of Jeffamine® D230. The mixture was stirred at room temperature and an aliquot was taken for DSC.

Comparative Example 5: BisABZ+EPOXY-1

To 2.31 g (0.01 mol) of finely ground BENZOXAZINE powder were added 1.25 g (0.01 mol) of EPOXY-1. The mixture was stirred at room temperature and an aliquot was taken for DSC.

Comparative Example 6: BisABZ+EPOXY-2

To 2.31 g (0.01 mol) of finely ground BENZOXAZINE powder were added 1.87 g (0.01 mol) of EPOXY-2. The mixture was stirred at room temperature and an aliquot was taken for DSC.

Example 1: BisABZ+4221+D230

To 2.31 g (0.01 mol) of finely ground BENZOXAZINE powder and 1.25 g (0.01 mol) of EPOXY-1 were added 1.15 g (0.01 mol) of Jeffamine® D230. The mixture was stirred at room temperature and aliquots were taken for DSC.

Example 2: BisABZ+828+D230

To 2.31 g (0.01 mol) of finely ground BENZOXAZINE powder and 1.87 g (0.01 mol) of EPOXY-2 were added 1.15 g (0.01 mol) of Jeffamine® D230. The mixture was stirred at room temperature and aliquots were taken for DSC and adhesion testing.

Varying the Ratio of Benzoxazine to Epoxy (BZ/EP.)

Example 3: 2×BisABZ+4221+2×D230

To 4.62 g (0.02 mol) of finely ground BENZOXAZINE powder and 1.25 g (0.01 mol) of EPOXY-1 were added 2.30 g (0.02 mol) of Jeffamine® D230. The mixture was stirred at room temperature and aliquots were taken for DSC.

Example 4: BisABZ+2×4221+D230

To 2.31 g (0.01 mol) of finely ground BENZOXAZINE powder and 2.50 g (0.02 mol) of EPOXY-1 were added 1.15 g (0.01 mol) of Jeffamine® D230. The mixture was stirred at room temperature and aliquots were taken for DSC.

Example 5: 2×BisABZ+828+3×D230

To 4.62 g (0.02 mol) of finely ground BENZOXAZINE powder and 1.87 g (0.01 mol) of EPOXY-2 were added 34.5 g (0.03 mol) of Jeffamine® D230. The mixture was stirred at room temperature and aliquots were taken for DSC.

Example 6: BisABZ+2×828+3×D230

To 2.31 g (0.01 mol) of finely ground BENZOXAZINE powder and 3.74 g (0.02 mol) of EPOXY-2 were added 3.45 g (0.03 mol) of Jeffamine® D230. The mixture was stirred at room temperature and aliquots were taken for DSC.

Varying the Amine Ratio

Example 7: BisABZ+4221+2×D230

To 2.31 g (0.01 mol) of finely ground BENZOXAZINE powder and 1.25 g (0.01 mol) of EPOXY-1 were added 2.30 g (0.02 mol) of Jeffamine® D230. The mixture was stirred at room temperature and aliquots were taken for DSC.

Example 8: BisABZ+4221+0.5×D230

To 2.31 g (0.01 mol) of finely ground BENZOXAZINE powder and 1.25 g (0.01 mol) of EPOXY-1 were added 0.58 g (0.005 mol) of Jeffamine® D230. The mixture was stirred at room temperature and aliquots were taken for DSC.

Example 9: BisABZ+828+2×D230

To 2.31 g (0.01 mol) of finely ground BENZOXAZINE powder and 1.87 g (0.01 mol) of EPOXY-2 were added 4.60 g (0.02 mol) of Jeffamine® D230. The mixture was stirred at room temperature and aliquots were taken for DSC.

Example 10: BisABZ+828+0.5×D230

To 2.31 g (0.01 mol) of finely ground BENZOXAZINE powder and 1.87 g (0.01 mol) of EPOXY-2 were added 1.15 g (0.005 mol) of Jeffamine® D230. The mixture was stirred at room temperature and aliquots were taken for DSC.

The differential scanning calorimetry (DSC) trace for Comparative Example 3 (CE-3) in FIG. 1 depicts cycloaliphatic epoxide ERL 4221 heated in the presence (1:1 stoichiometric ratio) of a primary aliphatic amine (Jeffamine® D230). The onset of the exotherm is circa 150° C. with a broad diffuse peak at about 225° C. In comparison, the exotherm of the benzoxazine cured by the same amine occurs at 85° C. with a peak 125° C. (trace CE-2).

When the two thermosets are heated in the absence of a curative (trace CE-5) and presumably benzoxazine is forced to homopolymerize, the onset of the cure is past 200° C. with a peak at temperature beyond 250° C. Here, the only pathway open to the epoxy ring opening is via the phenaphenoxide attack, and that phenol is only generated by the opening of the benzoxazine ring. The amount of heat released is nearly 400 J/g, which is consistent with the energies of opening both the benzoxazine and epoxide rings.

When all three ingredients are present in equal stoichiometric amounts, two distinct exotherms are observed: the lower one has a peak at about 130° C. (Example 1, trace E-1) which coincides nicely with the cure of the benzoxazine by the same amine. The higher temperature peak occurs at about 250° C., indicating the cycloaliphatic ring opening by either phenol or amine or some combination of both.

Varying the Stoichiometry

Doubling the amount of benzoxazine functionalities vs. the epoxide (Example E-3 vs. E-1) slightly depresses the lower temperature exotherm (by 4° C.), while favoring the epoxide with a two-fold excess (E-4 vs. E-1) shifts the exotherm to higher temperatures by the same 4° C. amount. At the same time, in both cases the amount of the heat released during the cure is lower than in the strict molar equivalent case.

The higher temperature peak location is affected by varying the Benzoxazine:Epoxy ratio in a manner similar to its lower temperature analogue. At peaks with a doubled amount of epoxide, the numbers of those species capable of opening the epoxide are effectively reduced and the exotherm shifts to higher temperatures. On the other hand, doubling the number of the available phenols by doubling the benzoxazine ratio shifts the high temperature exotherm 7° C. lower. The exotherm amount is not affected.

At the same time, fixing the benzoxazine to epoxy moiety ratio to unity and varying the amount of available amine results in a more subtle change. Halving the amount of the available amine (Example E-8 vs. E-1) halves the amount of energy released in the lower temperature cure exotherm while increasing the energy released at the higher temperature cure by only a third.

When the system is flooded with excess amine (double the reference amount, E-7 vs. E-1), the lower temperature cure is unaffected, as there is no change to the lower temperature DSC peak, but the higher temperature peak essentially vanishes, culminating in a sharp endotherm at temperatures above 260° C., attributable to the boiling of the amine.

Figure 2:
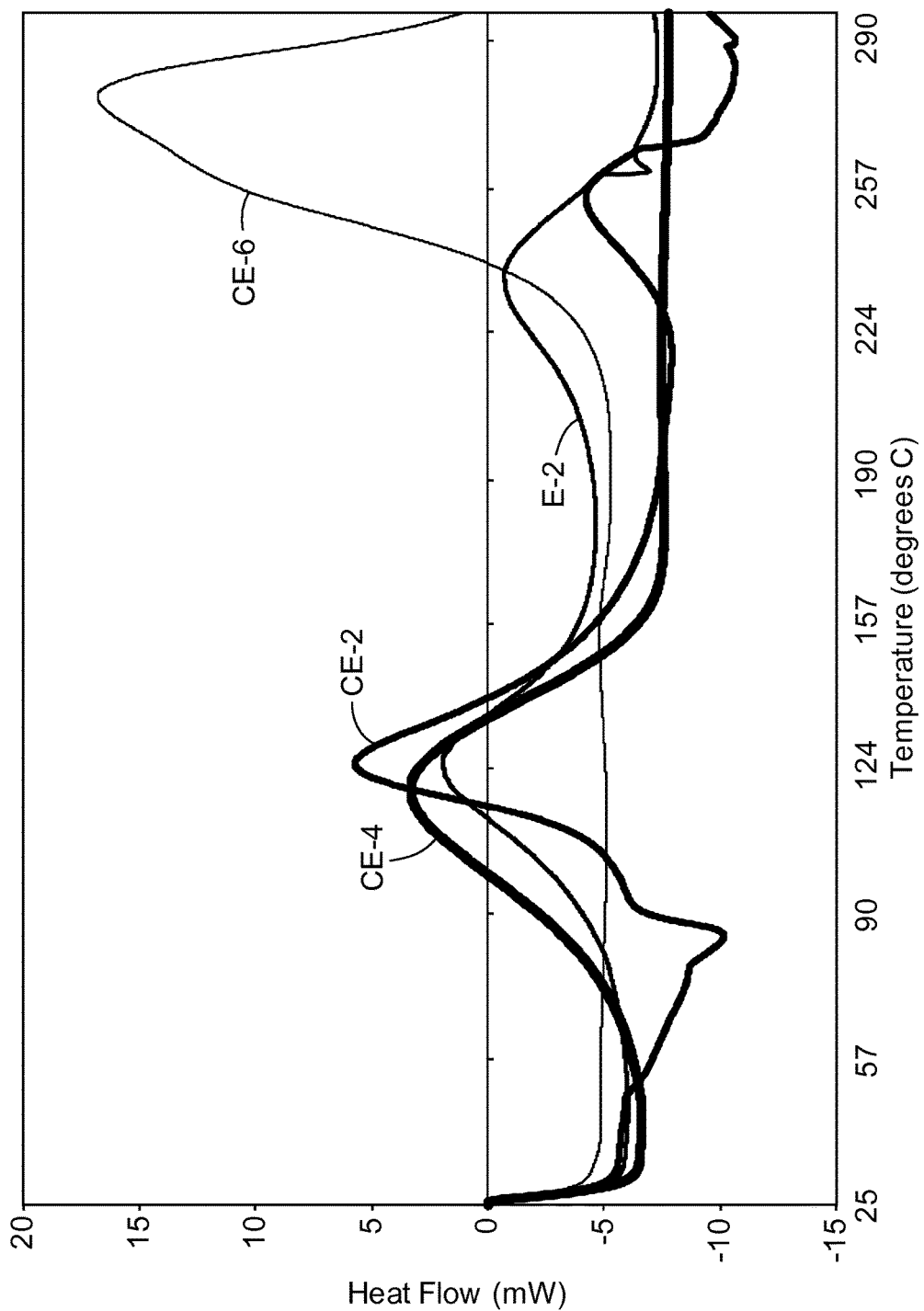
FIG. 2: DSC Cure Traces of Examples E-2, CE-2, CE-4, and CE-6.

The DSC trace for Comparative Example 4 (CE-4) in FIG. 2 depicts a broad low temperature cure of epoxide EPON™ 828 (diglycidyl ether of bisphenol-A, DGEBA) by D230 amine. Its onset is barely above room temperature, with a peak at 120° C. The benzoxazine, based on the same bisphenol-A as DGEBA, shows a sharper cure (trace CE-2) with its high temperature profile coinciding with that of the epoxide cure. The onset of the lower temperature side of the peak is sharper because, unlike the epoxide, the benzoxazine is a crystalline solid at room temperature and exhibits a melting point endotherm near 85° C. The energies released during the cures are similar. A subtle difference is the homopolymerization ability of benzoxazines; above 250° C. there is a slight peak due to the unreacted residual benzoxazine groups homopolymerizing.

Effect of Acid and Superacid Cure Catalysts

It is known that the presence of acids or "superacids" can accelerate the cure of epoxy resins. The effect of adding an acid cure catalyst such as p-toluene sulfonic acid (p-TsOH) or King Industries' Nacure® 7231 to the cycloaliphatic epoxide formulation in Example 1 and the glycidyl epoxide formulation from Example 2 is described below.

Example 11: BisABZ+4221+D230+Nacure® 7231

Superacid Nacure® 7231 was added to the cycloaliphatic epoxide formulation of Example 1, as described here. To 2.31 g (0.01 mol) of finely ground BENZOXAZINE powder and 1.25 g (0.01 mol) of EPOXY-1 with 0.2 g (5%) Nacure 7231 were added 1.15 g (0.01 mol) of Jeffamine® D230. The mixture was stirred at room temperature and aliquots were taken for DSC.

Example 12: BisABZ+4221+D230+p-Toluene Sulfonic Acid p-toluene sulfonic acid was added to the cycloaliphatic epoxide formulation of Example 1, as described here. To 2.31 g (0.01 mol) of finely ground BENZOXAZINE powder and 1.25 g (0.01 mol) of EPOXY-1 with 0.2 g (5%) p-toluene sulfonic acid were added 1.15 g (0.01 mol) of Jeffamine® D230. The mixture was stirred at room temperature and aliquots were taken for DSC.

Figure 3:
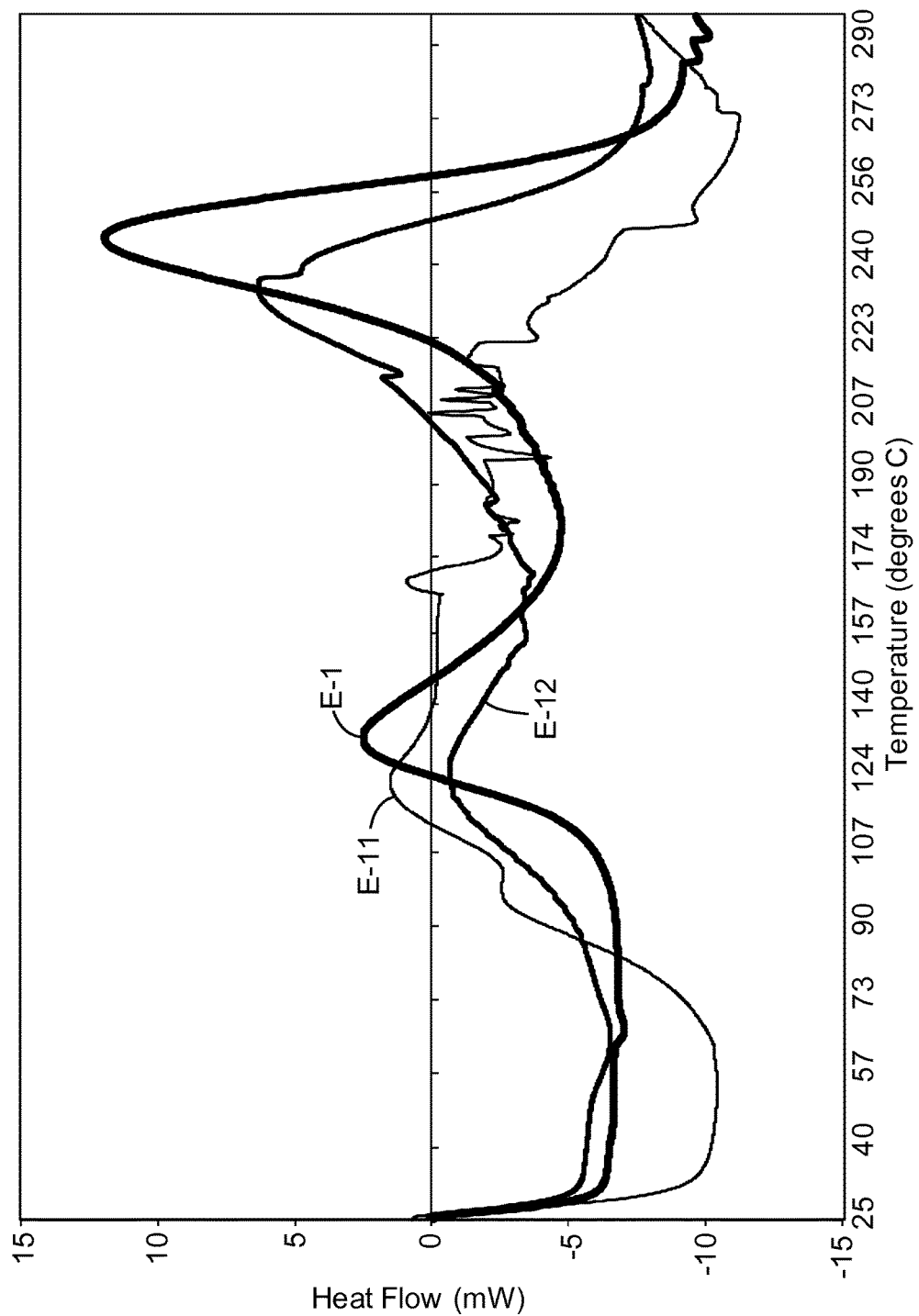
FIG. 3. DSC Cure Traces with and without superacids, Examples 1, 11, and 12

A comparison of the DSC scans for Examples 1, 11, and 12 is shown in FIG. 3.

Example 13: BisABZ+828+D230+Nacure® 7231

Superacid Nacure® 7231 was added to the glycidyl epoxide formulation of Example 2, as described here. To 2.31 g (0.01 mol) of finely ground BENZOXAZINE powder and 1.87 g (0.01 mol) of EPOXY-2 with 0.2 g (5%) Nacure® 7231 were added 1.15 g (0.01 mol) of Jeffamine® D230. The mixture was stirred at room temperature and aliquots were taken for DSC.

Example 14: BisABZ+828+D230+p-Toluene Sulfonic Acid p-Toluene sulfonic acid was added to the glycidyl epoxide formulation of Example 2, as described here. To 2.31 g (0.01 mol) of finely ground BENZOXAZINE powder and 1.87 g (0.01 mol) of EPOXY-2 with 0.2 g (5%) p-toluene sulfonic acid were added 1.15 g (0.01 mol) of Jeffamine® D230. The mixture was stirred at room temperature and aliquots were taken for DSC.

Figure 4:
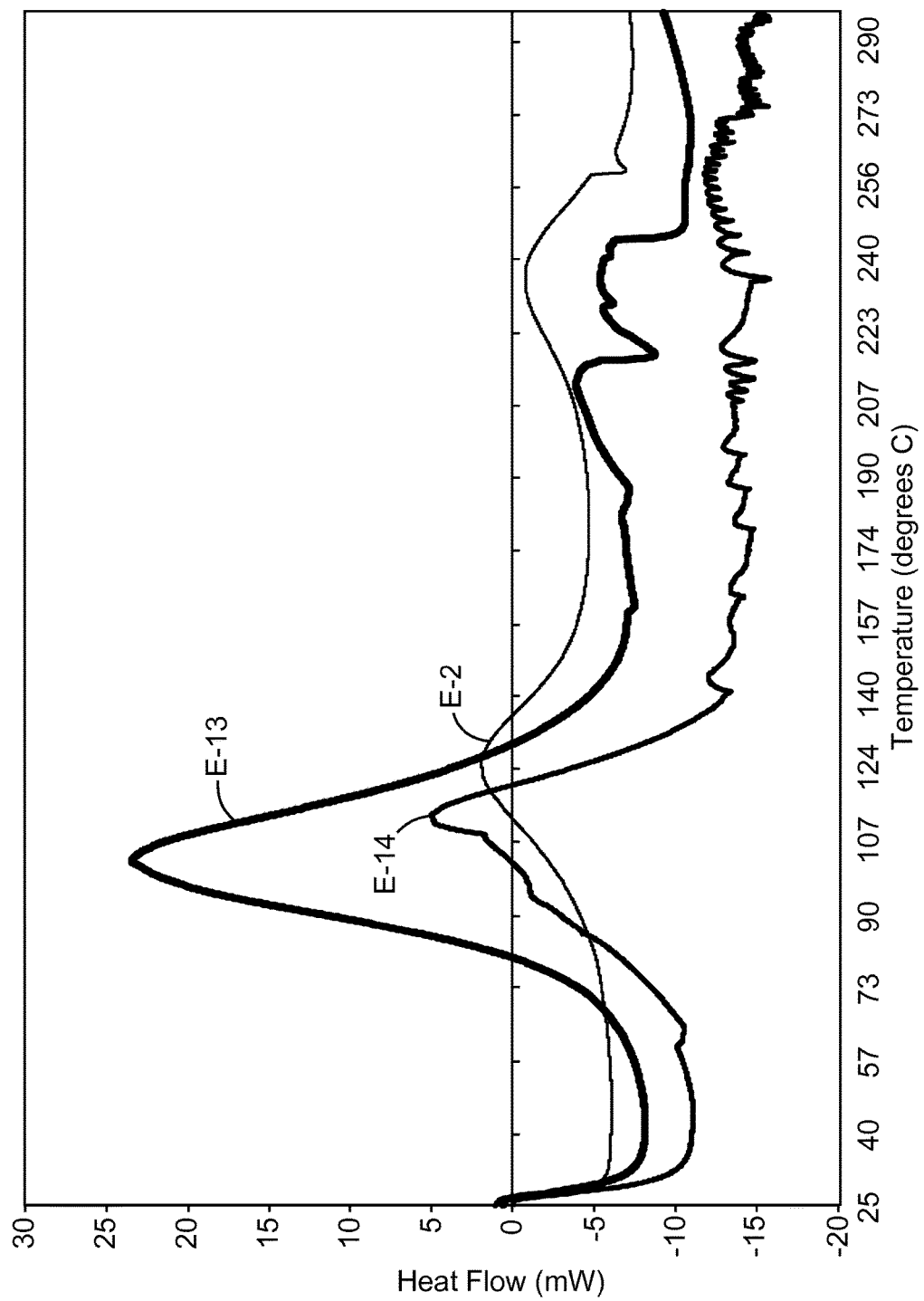
FIG. 4: DSC Cure Traces with and without superacids, Examples 2, 13, and 14

A comparison of the DSC scans for Examples 2, 13, and 14 is shown in FIG. 4.

TABLE 3

Summary of DSC data for epoxide amine benzoxazine cures with and without acid catalysts

| Sample ID | System/Acid | Onset (° C.) | Peak T (° C.) | ΔH Rxn (J/g) |
| --- | --- | --- | --- | --- |
| Ex. 1 | 4221 | 90 | 133 | 272 |
| Ex. 11 | 4221/Nacure 7231 | 74 | 123 | 248 |
| Ex. 12 | 4221/p-TsOH | 67 | 120 | 344 |
| Ex. 2 | 828 | 88 | 125 | 168 |
| Ex. 13 | 828/Nacure 7231 | 76 | 104 | 310 |
| Ex. 14 | 828/p-TsOH | 64 | 114 | 120 |

This data indicates that the addition of (Lewis or Brönsted) acids accelerates the amine cure of benzoxazine+epoxy adducts as indicated by the lower onset of polymerization temperature and reduced temperature of the peak of the exotherm corresponding to the cure.

Properties, Applications and Utility

Adhesive Properties

Novel amine curable epoxy-benzoxazine compositions are particularly useful as structural adhesives. While the dynamic mechanical analysis (DMA) and thermogravimetric analysis (TGA) results below highlight the materials' excellent thermal properties, overlap shear and peel tests were additionally performed to investigate the adhesive properties of the novel benzoxazines and to compare them with those in the art.

Example 15: BisABZ+4221+D230CS 23.1 g (0.1 mol) of BENZOXAZINE powder was heated at 100° C. and allowed to melt. To that molten mass 12.5 g (0.1 mol) of EPOXY-1 heated to 100° C. was added and was stirred hot for approximately 2 minutes until a uniform mixture was obtained. To that mixture were added 23 grams of "D230CS," a mixture of 11.5 grams of Paraloid™ 2600 core-shell (CS) powder pre-dispersed in 11.5 g (0.1 mol) of Jeffamine™ D230 at room temperature by means of a mechanical mixer. The mixture was stirred until uniform while warm and adhesive films were prepared for adhesive testing employing a procedure described below.

Example 16: BisABZ+828+2×D230CS 23.1 g (0.1 mol) of BENZOXAZINE powder was heated at 100° C. and allowed to melt. To that molten mass 18.7 g (0.1 mol) of EPOXY-2 heated to 100° C. were added and stirred hot for approximately 2 minutes until a uniform mixture was obtained. To that mixture were added 46 grams of a mixture of 23 grams of Paraloid™ 2600 core-shell powder pre-dispersed in 23 g (0.2 mol) of Jeffamine® D230 at room temperature by means of a mechanical mixer. The mixture was stirred to uniform while warm and adhesive films were prepared for adhesive testing employing a procedure described below.

Example 17: BisABZ+MX-125+2×D230CS 23.1 g (0.1 mol) of BENZOXAZINE powder was heated at 100° C. and allowed to melt. To that molten mass 24.9 grams (0.1 mol of epoxy) of EPOXY-3 (MX-125) heated to 100° C. were added and stirred hot for approximately 2 minutes until a uniform mixture was obtained. To that mixture were added 46 grams of a mixture of 23 grams of Paraloid™ 2600 core-shell powder pre-dispersed in 23 g (0.2 mol) of Jeffamine® D230 at room temperature by means of a mechanical mixer. The mixture was stirred to uniformity while warm and adhesive films were prepared for adhesive testing employing a procedure described below.

Film Preparation

Compositions of Examples 15 through 17 were deposited between two silicone release liner coated-polyethyleneterephthalate (PET) sheets, and 250 micrometer-thick film was obtained by pulling the corresponding aliquots through a knife coater that had been preheated to 100° C. The films were allowed to cool to room temperature and cure for approximately one week prior to the adhesive tests below.

The film of Example 15 which employed the cycloaliphatic epoxide remained liquid the longest, as anticipated by the DSC experiments.

All the adhesive samples were laminated and tested as described below using the films of the Examples 15 through 17.

TABLE 4

Summary of Adhesive Properties of Amine Cured Benzoxazine/Epoxide Compositions

| EXAMPLE # | Overlap Shear (psi) (mean, max, sd) [kPa] | Floating Roller peel test (lb/in) (mean, max, sd) |
|---|---|---|
| EXAMPLE 15 (4221) | 1969, 2536, 326 [13.6, 17.5, 2.2 kPa] | 12, 16, 2.4 |
| EXAMPLE 16 (828) | 5684, 5898, 194 [39.2, 40.7, 1.4 kPa] | 62, 75, 13 |
| EXAMPLE 17 (MX-125) | 5824, 6057, 145 [40.2, 41.8, 1.0 kPa] | 81, 86, 6.8 |

Thermal and Thermomechanical Properties
DMA (Dynamic Mechanical Analysis):
Compositions of Examples 15-17 were duplicated without the compounding of the additional Paraloid™ 2600 core-shell particles into the amine:

Example 18: BisABZ+4221+D230

23.1 g (0.1 mol) of BENZOXAZINE powder was heated at 100° C. and allowed to melt. To that molten mass 12.5 g (0.1 mol) of EPOXY-1 heated to 100° C. was added and stirred hot for approximately 2 minutes until a uniform mixture was obtained. To that mixture were added 11.5 g (0.1 mol) of Jeffamine® D230 at 100° C. The mixture was stirred to uniformity while warm and was deposited into a silicone mold to prepare DMA samples as described below.

Example 19: BisABZ+828+2×D230

23.1 g (0.1 mol) of BENZOXAZINE powder was heated at 100° C. and allowed to melt. To that molten mass 18.7 g (0.1 mol) of EPOXY-2 heated to 100° C. were added and stirred hot for approximately 2 minutes until a uniform mixture was obtained. To that mixture were added 23 g (0.2 mol) of Jeffamine® D230 at 100° C. The mixture was stirred to uniformity while warm and deposited into a silicone mold to prepare DMA samples as described below.

Example 20: BisABZ+MX-125+2×D230

23.1 g (0.1 mol) of BENZOXAZINE powder was heated at 100° C. and allowed to melt. To that molten mass 24.9 g (0.1 mol) of EPOXY-3 heated to 100° C. were added and stirred hot for approximately 2 minutes until a uniform mixture was obtained. To that mixture were added 23 g (0.2 mol) of Jeffamine® D230 at 100° C. The mixture was stirred to uniformity while warm and deposited into a silicone mold to prepare DMA samples as described below.

Figure 5:
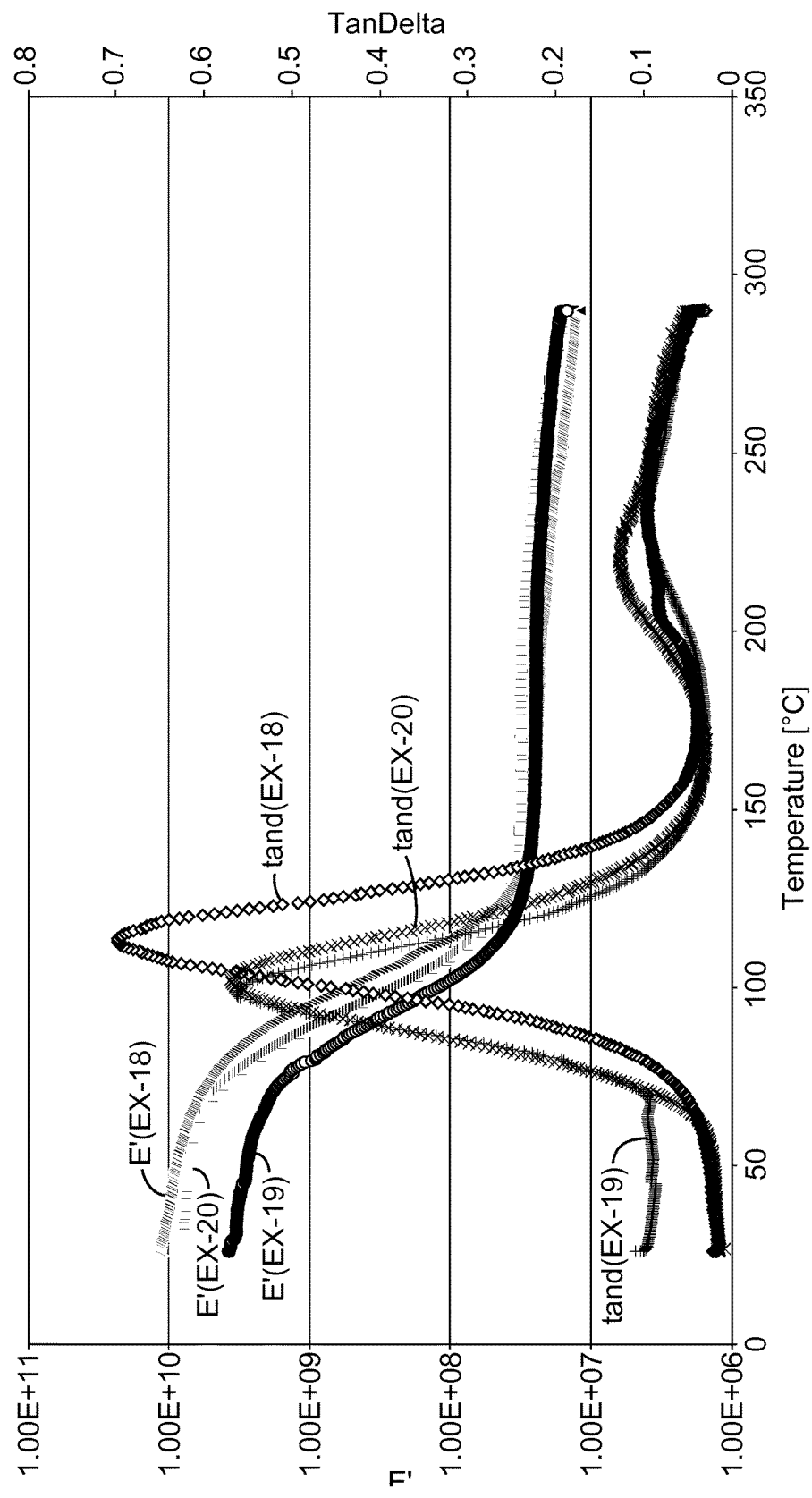
FIG. 5: Loss tangent data of Examples 18, 19 and 20.

The data on FIG. 5 suggests that the nature of the epoxide (cycloaliphatic vs. glycidyl) as well as its structure have very limited bearing on the resultant glass transition of the amine cured mixture of that epoxide with benzoxazine, as long as epoxy is not the major component.

Example 21: BisABZ+MX125+0.5×IPDA 23.1 g (0.1 mol) of BENZOXAZINE powder was heated at 100° C. and allowed to melt. To that molten mass 24.9 g (0.1 mol of epoxy) of EPOXY-3 heated to 100° C. were added and stirred hot for approximately 2 minutes until a uniform mixture was obtained. To that mixture were added 8.5 g (0.05 mol) of IPDA. The mixture was stirred to uniformity while warm and deposited into a silicone mold to prepare DMA samples as described below.
DMA trace of the composition of Example 21 shows a loss tangent maximum at 147° C.

Example 22: BisABZ+DER6510HT+0.5×IPDA 23.1 g (0.1 mol) of BENZOXAZINE powder was heated at 100° C. and allowed to melt. To that molten mass 42.5 g (0.1 mol of epoxy) of EPOXY-4 heated to 100° C. were added and stirred hot for approximately 2 minutes until a uniform mixture was obtained. To that mixture were added 8.5 g (0.05 mol) of IPDA. The mixture was stirred to uniformity while warm and deposited into a silicone mold to prepare DMA samples as described below.
The DMA trace of the composition of Example 22 shows a loss tangent maximum at 150° C.
Thermogravimetric Analysis (TGA)

Figure 6:
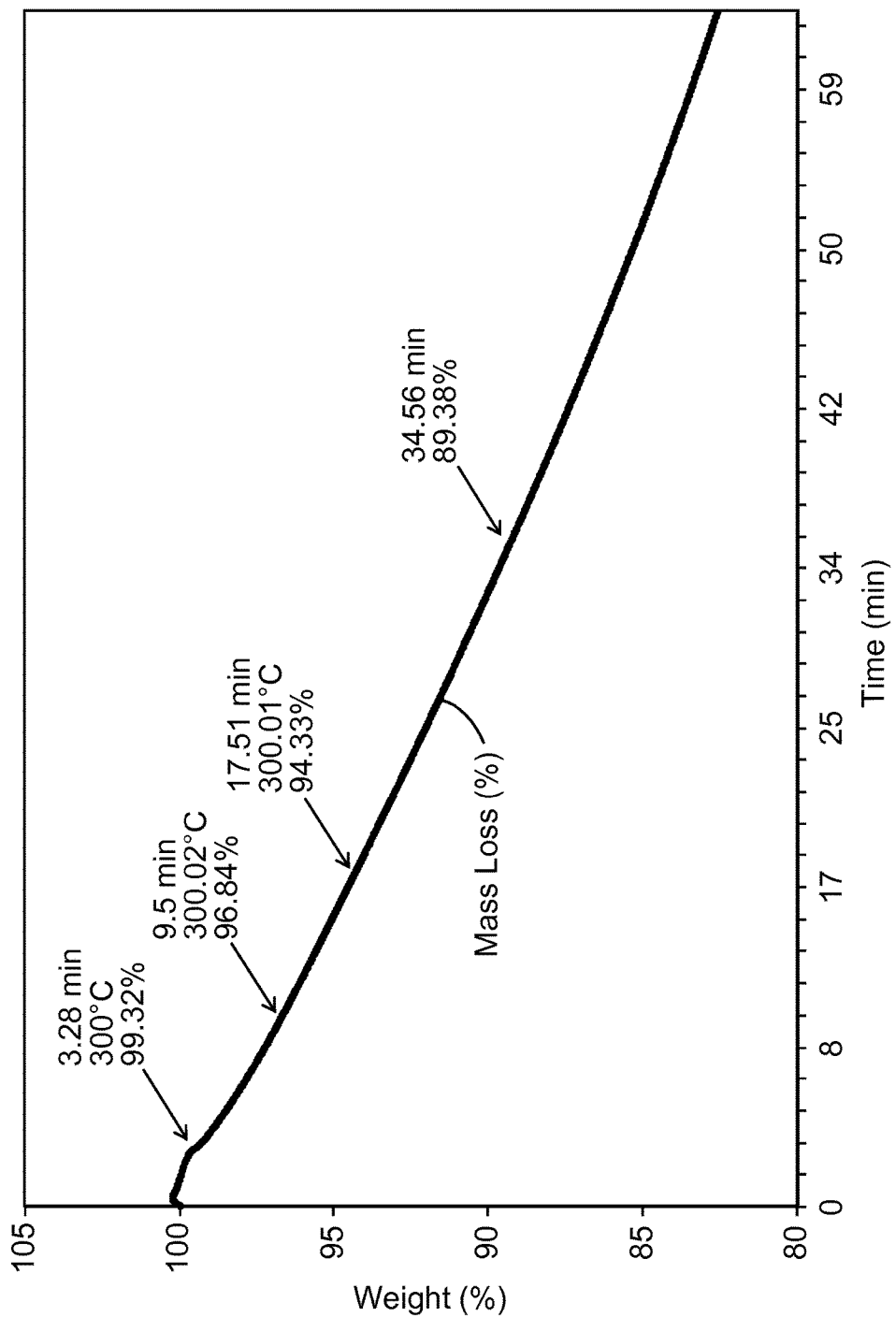
FIG. 6: Isothermal Mass Loss at 300° C. of an Amine Cured Epoxy/Benzoxazine Composition of Example E-19

Thermal stability of the amine cured epoxy-benzoxazine compositions has been evaluated via isothermal weight loss studies using the customarily employed thermogravimetric analysis (TGA) techniques. Aliquots of material prepared in Example 19 and evaluated in DMA have been isothermally annealed at several temperatures between 200° C. and 300° C., and times to reach 2.5%, 5% and 10% mass loss have been recorded at each of the temperatures, as illustrated in FIG. 6.
Shrinkage Upon Polymerization Example 23

To 23.1 g (0.1 mol) of molten BENZOXAZINE at 100° C., 24.9 g (0.1 mol) of EPOXY-3 heated to 100° C. were added and stirred to a uniform mass. To it, a 100° C. mixture of 23 g of Paraloid™ core-shell toughener dispersed in 23 grams (0.2 mol) of Jeffamine® D230 were added. The mixture was stirred until uniform and then deposited into a mold according to ASTM D2566. The mold was then placed into an oven at 180° C. for two hours. The sample was then allowed to cool to room temperature, and the sample was removed and measured with a caliper to show virtually zero shrinkage.
The material was very highly loaded with toughening particles, and to remove that variable another sample was prepared, with no core-shell toughener, in Example 24.

Example 24

To 69.3 g (0.3 mol) of molten BENZOXAZINE at 100° C., 56.1 g (0.3 mol) of EPOXY-2 heated to 100° C. were added and stirred to a uniform mass. To it, 69 grams of (0.6 mol) of Jeffamine® D230 heated to 100° C. were added. The mixture was stirred until uniform and then deposited into a mold according to ASTM D2566. The mold was then placed into an oven at 180° C. for two hours. The sample was then allowed to cool to room temperature, and the sample was removed and measured with a caliper to show less than 0.020 inches shrinkage for the 10 inch sample (0.2%). This is a significant improvement over the amine cured epoxies, where even the best compositions, highly loaded to minimize shrinkage, display >0.5% shrinkage.

This disclosure provides the following illustrative embodiments.
1. A curable composition comprising a benzoxazine, an epoxy compound and an amine compound.
2. The curable composition of embodiment 1, wherein at least one of said epoxy compound and amine compound is polyfunctional.
3. The curable composition of embodiment 1 wherein said epoxy compound is a polyepoxy compound.
4. The curable composition of embodiment 1 wherein said amine compound is a polyamine.
5. The curable composition of embodiment 1 comprising a polyepoxy and polyamine.
6. The curable composition of any of the previous embodiments wherein the benzoxazine is a polybenzoxazine.
7. The curable composition of embodiment 6 wherein the polybenzoxazine is of the formula:

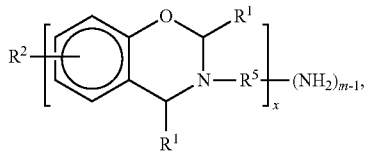

wherein
each of $R^1$ is H or an alkyl group;
$R^2$ is H, a covalent bond, or a polyvalent (hetero)hydrocarbyl group;
$R^5$ is the (hetero)hydrocarbyl residue of a primary amino compound having a valence of x,
m is 2-4; and
x is at least 1.
8. The curable composition of embodiment 6 wherein $R^5$ is a poly(alkyleneoxy) group.
9. The curable composition of embodiment 6 wherein the polbenzoxazine compound is of the formula:

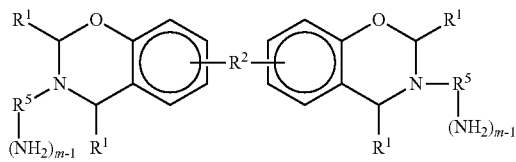

each of $R^1$ is H or an alkyl group;
$R^2$ is H, a covalent bond, or a divalent (hetero)hydrocarbyl group;
m is 2-4
$R^5$ is the (hetero)hydrocarbyl group.

10. The curable composition of embodiment 6 wherein the polybenzoxazine compound is of the formula:

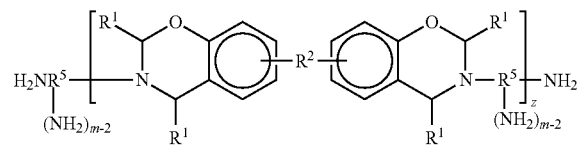

wherein,
each of $R^1$ is H or an alkyl group;
$R^2$ is a covalent bond, or a divalent (hetero)hydrocarbyl group;
m is 2-4;
z is at least 2;
$R^5$ is the divalent (hetero)hydrocarbyl residue of a primary diamino compound.
11. The curable composition of any of the previous embodiments wherein the epoxy compound is of the formula

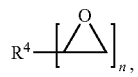

where $R^4$ is an (hetero)hydrocarbyl having a valence of n, and n is 1 to 6.
12. The curable composition of embodiment 11 wherein $R^4$ is a non-polymeric aliphatic, cycloaliphatic, aromatic or alkyl-substituted aromatic moiety having from 1 to 30 carbon atoms and optionally 1 to four catenary heteroatoms of oxygen, nitrogen or sulfur.
13. The curable composition of embodiment 11 wherein the $R^4$ is a glycidyl group.
14. The curable composition of any of the previous embodiments, wherein the reaction product of the epoxy compound with the amine compound is of the formula

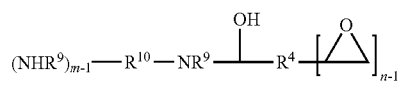

where $R^4$ is an (hetero)hydrocarbyl having a valence of n, and n is 1 to 6
$R^9$ is H or a hydrocarbyl group, including aryl and alkyl;
$R^{10}$ is the (hetero)hydrocarbyl group, and
m is 1 to 6.
15. The curable composition of any of the previous embodiments, wherein said amine is of the formula:
$R^{10}(NHR^9)_p$, wherein
$R^{10}$ is (hetero)hydrocarbyl group;
p is 1 to 6, and
each $R^9$ is H or a hydrocarbyl group.
16. The curable composition of any of the previous embodiments, wherein the reaction product of the benzoxazine with the amine compound is of the formula:

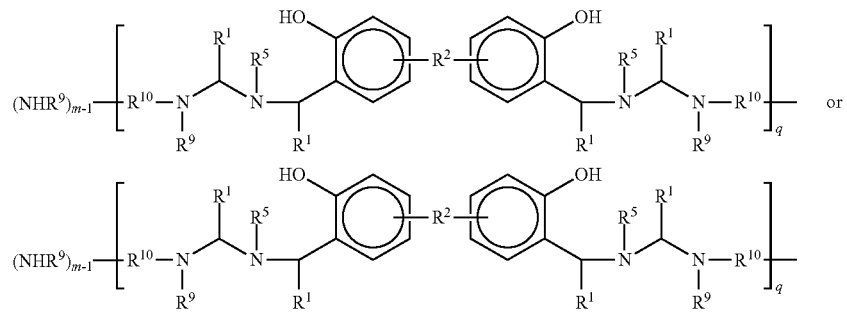

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
$R^{10}$ is the (hetero)hydrocarbyl group,
$R^9$ is H or a hydrocarbyl group, including aryl and alkyl, and
m is 1 to 6
q is at least 1.

17. The curable composition of any of the previous embodiments, wherein the amine/benzoxazine/epoxy adduct is of the formula:

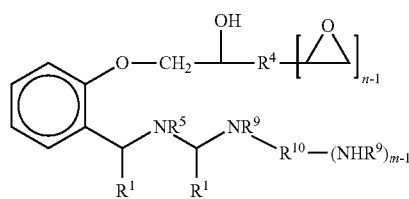

II wherein
II
wherein
each $R^1$ is H or an alkyl group, and is the residue of an aliphatic aldehyde,
$R^5$ is the (hetero)hydrocarbyl residue of a primary amino compound, which may be a mono- or polyamine
R10 is the (hetero)hydrocarbyl group,
$R^9$ is H or a hydrocarbyl group, including aryl and alkyl,
n is 1 to 6;
m is 1 to 6.

18. The composition of any of the previous embodiments, wherein the molar ratio of amine groups to the sum of the epoxy groups and the benzoxazine groups is from 2:1 to 1:10.

19. The composition of any of the previous embodiments, wherein the molar ratio of amine groups to the sum of the epoxy groups and the benzoxazine groups is from 1:1 to 1:2.

20. The composition of any of the previous embodiments wherein the ratio of epoxy equivalents to benzoxazine equivalents in the composition is from 50:1 to 1:5.

What is claimed is:
1. A curable composition consisting essentially of:
a) a polybenzoxazine, wherein the polybenzoxazine is of the formula:

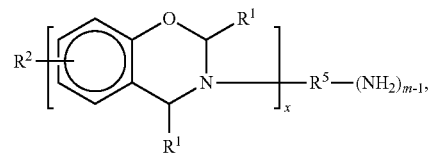

wherein:
each of $R^1$ is H or an alkyl group;
$R^2$ is H, a covalent bond, or a polyvalent (hetero)hydrocarbyl group;
$R^5$ is the (hetero)hydrocarbyl residue of a primary amino compound having a valence of x,
m is 2-4; and x is at least 1; and
b) an epoxy compound of the formula

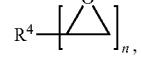

wherein: $R^4$ is a non-polymeric aliphatic, cycloaliphatic, aromatic or alkyl-substituted aromatic moiety having from 1 to 30 carbon atoms and, optionally, 1 to four catenary heteroatoms of oxygen, nitrogen or sulfur having a valence of n, and n is 1 to 6; and
c) an amine compound of the formula:
$R^{10}(NHR^9)_m$,
wherein:
$R^{10}$ is a polymeric polyoxyalkylene;
each $R^9$ is independently H or a hydrocarbyl group, and m is 1 to 6;
wherein the molar ratio of amine groups to the sum of epoxy groups and benzoxazine groups is from 2:1 to 1:10.

2. The curable composition of claim 1 wherein said epoxy compound is a polyepoxy compound.

3. The curable composition of claim 1 wherein said amine compound is a polyamine.

4. The curable composition of claim 1 comprising a polyepoxy and polyamine.

5. The curable composition of claim 1 wherein $R^5$ is a poly(alkyleneoxy) group.

6. The curable composition of claim 1 wherein the $R^4$ is a glycidyl group.

7. A curable composition according to claim 1, comprising:
(a) the reaction product of the polybenzoxazine with the amine compound according to the formulas:

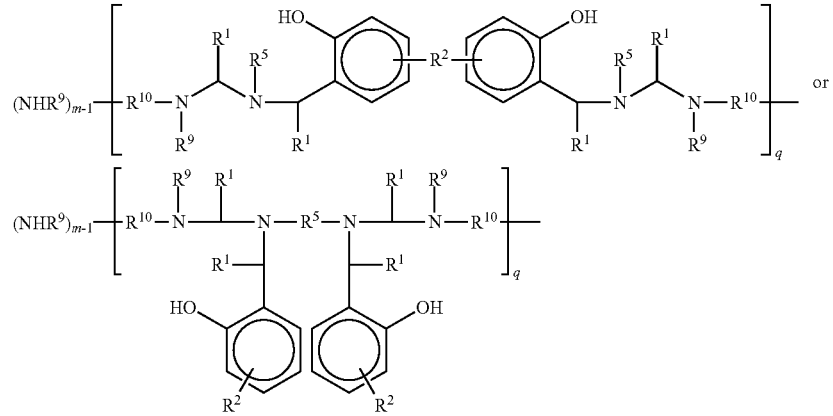

wherein:
each $R^1$ is H or an alkyl group, and is a residue of an aliphatic aldehyde,
$R^2$ is H, a covalent bond, or a polyvalent (hetero)hydrocarbyl group,
$R^5$ is the (hetero)hydrocarbyl residue of a primary amino compound
$R^{10}$ is a polymeric polyoxyalkylene, and
$R^9$ is H or a hydrocarbyl group, and
m is 1 to 6
q is at least 1; and
b) an epoxy compound of the formula

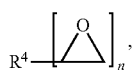

wherein: $R^4$ is a non-polymeric aliphatic, cycloaliphatic, aromatic or alkyl-substituted aromatic moiety having from 1 to 30 carbon atoms and optionally 1 to four catenary heteroatoms of oxygen, nitrogen or sulfur having a valence of n, and n is 1 to 6.

8. The composition of claim 1, wherein the molar ratio of amine groups to the sum of epoxy groups and benzoxazine groups is from 1:1 to 1:2.

9. The composition of claim 1, wherein the ratio of epoxy equivalents to benzoxazine equivalents in the composition is from 50:1 to 1:5.

10. A curable composition consisting essentially of:
a) a polybenzoxazine, wherein the polybenzoxazine compound is of the formula:

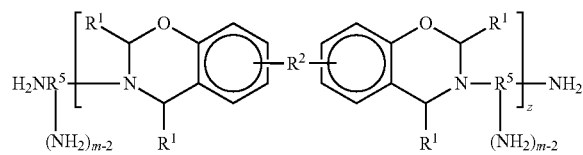

wherein,
each of $R^1$ is H or an alkyl group;
$R^2$ is a covalent bond, or a divalent (hetero)hydrocarbyl group;
m is 2-4;
z is at least 2;
$R^5$ is the divalent (hetero)hydrocarbyl residue of a primary diamino compound; and
b) an epoxy compound of the formula

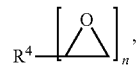

wherein: $R^4$ is a non-polymeric aliphatic, cycloaliphatic, aromatic or alkyl-substituted aromatic moiety having from 1 to 30 carbon atoms and optionally 1 to four catenary heteroatoms of oxygen, nitrogen or sulfur having a valence of n, and n is 1 to 6; and
c) an amine compound of the formula:
$R^{10}(NHR^9)_m$,
wherein;
$R^{10}$ is a polymeric polyoxyalkylene;
each $R^9$ is independently H or a hydrocarbyl group, and
m is 1 to 6;
wherein the molar ratio of amine groups to the sum of the epoxy groups and the benzoxazine groups is from 2:1 to 1:10.

11. The curable composition of claim 10 wherein said epoxy compound is a polyepoxy compound.

12. The curable composition of claim 10 wherein said amine compound is a polyamine.

13. The curable composition of claim 10 comprising a polyepoxy and polyamine.

14. The curable composition of claim 10 wherein $R^5$ is a poly(alkyleneoxy) group.

15. The curable composition of claim 10 wherein the $R^4$ is a glycidyl group.

16. The composition of claim 10, wherein the molar ratio of amine groups to the sum of epoxy groups and benzoxazine groups is from 1:1 to 1:2.

17. The composition of claim 10, wherein the ratio of epoxy equivalents to benzoxazine equivalents in the composition is from 50:1 to 1:5.

* * * * *

UNITED STATES PATENT AND TRADEMARK OFFICE
CERTIFICATE OF CORRECTION

| | | |
|---|---|---|
| PATENT NO. | : 9,695,273 B2 | |
| APPLICATION NO. | : 14/345258 | |
| DATED | : July 4, 2017 | |
| INVENTOR(S) | : Ilya Gorodisher | |

It is certified that error appears in the above-identified patent and that said Letters Patent is hereby corrected as shown below:

In the Specification

Column 3,
Lines 10 & 11, delete "norbornyl.and" and insert -- norbornyl and --, therefor.
Line 32, delete "benzthiazolyl." and insert -- benzothiazolyl. --, therefor.
Lines 45 & 46, delete "phenoxyethoxyl)" and insert -- phenoxyethoxy) --, therefor.
Line 53, after "CE-5" insert -- . --.
Line 57, after "12" insert -- . --.
Line 59, after "14" insert -- . --.
Line 62, after "E-19" insert -- . --.

Column 5,
Lines 55 through 60, delete

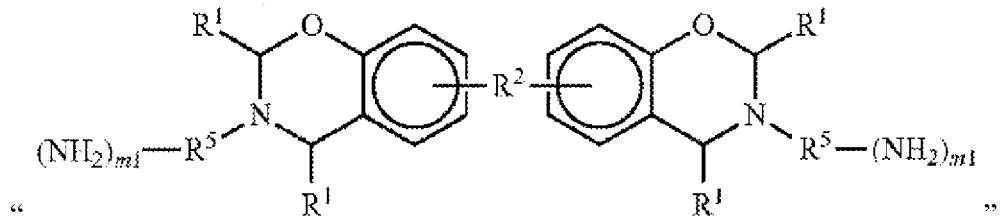

"                                                                          "

and insert

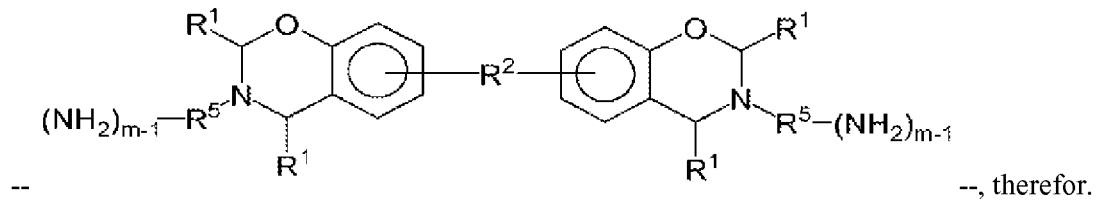

--                                                                           --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)

Column 6,
Line 12, delete "benzthiazolyl." and insert -- benzothiazolyl. --, therefor.
Line 14, delete "allyphenol;" and insert -- allylphenol; --, therefor.
Lines 18 & 19, delete "dihydroxnaphthalene;" and insert -- dihydroxynaphthalene; --, therefor.

Column 7,
Line 10, delete "polyoxyethylenediamine" and insert -- polyoxyethylenediamine. --, therefor.

Column 8,
Lines 36 through 42, delete

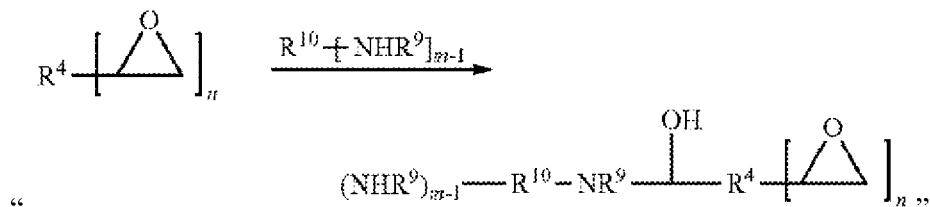

"

and insert

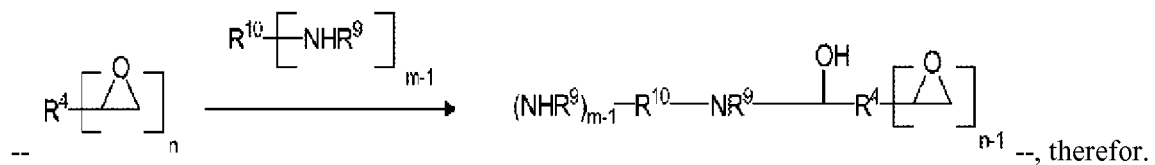

-- --, therefor.

Column 8,
Line 44, after "6" insert -- ; --.

Column 9,
Line 12, delete "epoxypropoxyl)" and insert -- epoxypropoxy) --, therefor.

Column 10,
Line 12, delete "polyamines" and insert -- polyamines. --, therefor.

Column 13,
Line 42, delete "calorimetry" and insert -- Calorimetry --, therefor.
Line 45, delete "calorimeter" and insert -- Calorimeter --, therefor.

Columns 15 & 16,
Line 14, delete "Isopheronediamine," and insert -- Isophoronediamine, --, therefor.

Column 17,
Line 50, delete "calorimeter." and insert -- Calorimeter. --, therefor.

CERTIFICATE OF CORRECTION (continued)

Column 20,
Line 12, delete "CE-5)" and insert -- CE-5,) --, therefor.
Line 16, delete "phenaphenoxide" and insert -- phenol/phenoxide --, therefor.
Line 22, delete "E-1)" and insert -- E-1,) --, therefor.

Column 25,
Lines 19 through 25, delete

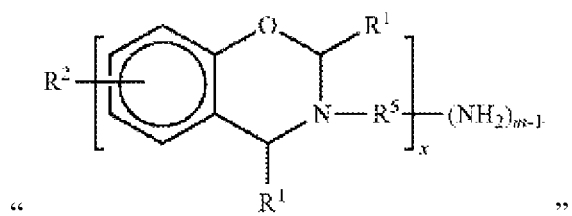

" "

and insert

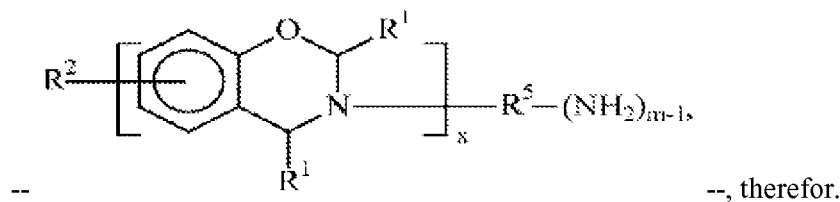

-- --, therefor.

Column 25,
Line 37, delete "polbenzoxazine" and insert -- polybenzoxazine --, therefor.

Column 27,
Line 31, delete "R10" and insert -- $R^{10}$ --, therefor.

In the Claims

Column 29,
Line 27, in Claim 9, delete "1," and insert -- 1 --, therefor.